(12) United States Patent
Castle et al.

(10) Patent No.: US 10,540,619 B2
(45) Date of Patent: Jan. 21, 2020

(54) SYSTEM AND METHOD FOR RESOURCE-AWARE PASTRY CUSTOMIZATION

(71) Applicant: ARYZTA LLC, Los Angeles, CA (US)

(72) Inventors: Darryl Craig Castle, Waterloo (CA); Deborah Ann Cochrane, Burlington (CA); Nicholas Alexander Wojcicki, Burlington (CA)

(73) Assignee: ARYZTA, LLC, Los Angeles, CA (US)

( * ) Notice: Subject to any disclaimer, the term of this patent is extended or adjusted under 35 U.S.C. 154(b) by 233 days.

(21) Appl. No.: 15/799,968

(22) Filed: Oct. 31, 2017

(65) Prior Publication Data

US 2018/0121842 A1 May 3, 2018

Related U.S. Application Data

(60) Provisional application No. 62/415,421, filed on Oct. 31, 2016.

(51) Int. Cl.
*G06Q 10/06* (2012.01)
*G06Q 50/12* (2012.01)
*G06Q 10/08* (2012.01)
*G06Q 30/06* (2012.01)

(52) U.S. Cl.
CPC ..... *G06Q 10/0631* (2013.01); *G06Q 10/0637* (2013.01); *G06Q 10/087* (2013.01); *G06Q 50/12* (2013.01); *G06Q 30/0643* (2013.01)

(58) Field of Classification Search
CPC .................................................. G06Q 30/0643
See application file for complete search history.

(56) References Cited

U.S. PATENT DOCUMENTS

| 10,318,904 | B2* | 6/2019 | Johnson | G06Q 10/06315 |
| 2007/0265935 | A1* | 11/2007 | Woycik | G06Q 20/367 |
| | | | | 705/65 |
| 2013/0130208 | A1* | 5/2013 | Riscalla | G06Q 30/0603 |
| | | | | 434/127 |
| 2014/0279092 | A1* | 9/2014 | Hurst | G06Q 30/0641 |
| | | | | 705/15 |

FOREIGN PATENT DOCUMENTS

CN     201182159 Y  *  1/2009

* cited by examiner

*Primary Examiner* — A. Hunter Wilder
(74) *Attorney, Agent, or Firm* — Sheppard, Mullin, Richter & Hampton LLP

(57) ABSTRACT

An example system includes at least one hardware processor and memory storing program code to receive a request for a customized pastry order, identify a retailer to fulfill the customized pastry order, identify retailer resource information identifying customizable elements and capacity information available from the retailer, identify, available from the retailer, pastry types including a with-graphic type or a without-graphic type, receive user selection of a particular pastry type, if the particular pastry type identifies a with-graphic type, then present for user selection one or more customizable elements available from the retailer, the one or more customizable elements being based on the retailer resource information and on the particular pastry type, receive user selections, each user selection identifying at least one particular option, obtain an image for presentation on the at least one customizable pastry, and initiate the customized pastry order based on the user selections and on the image.

20 Claims, 20 Drawing Sheets

SYSTEM AND METHOD FOR RESOURCE-AWARE PASTRY CUSTOMIZATION

CROSS-REFERENCE TO RELATED APPLICATIONS

The present application claims priority to U.S. Provisional Patent Application Ser. No. 62/415,421, filed Oct. 31, 2016 and entitled "Systems and Methods for Customized Donut Designs," which is incorporated by reference herein.

TECHNICAL FIELD

Embodiments of the present invention related generally to customization of consumer products. More particularly, the present invention relates to a system and method of resource-aware customized pastry creation.

BACKGROUND

Customers enjoy pastries, such as donuts, cupcakes and cookies. People often purchase pastries for celebratory events such as birthdays, graduations, holidays, and weddings. At times, people may want to enhance the pastries for particular celebratory events. However, most pastry facilities offer very limited enhancements, such as the ability to write "Happy Birthday" on a cupcake. There is little to no ability to enhance a donut or a cookie. It would be helpful to offer systems and methods to offer greater enhancement of pastries. Further, it would be helpful to offer systems and methods that can support making sure enhanced pastry orders can be completed.

SUMMARY

An example system includes at least one hardware processor and memory storing program code executable by the at least one hardware processor to receive a request for a customized pastry order for at least one customized pastry, identify a retailer to fulfill the customized pastry order, identify retailer resource information, the retailer resource information identifying customizable elements and capacity information available from the retailer, identify pastry types available from the retailer, the pastry types including a with-graphic type or a without-graphic type, receive user selection of a particular pastry type of the pastry types available from the retailer, if the particular pastry type identifies a with-graphic type, then present for user selection one or more options of each of one or more customizable elements available from the retailer, the one or more customizable elements being based on the retailer resource information and on the particular pastry type, receive user selections, each user selection identifying at least one particular option for each of the one or more customizable elements available from the retailer, obtain an image for presentation on the at least one customizable pastry, and initiate the customized pastry order based on the user selections and on the image.

The at least one customized pastry may comprises at least one donut. In some embodiments, the retailer is identified by geographic location. The retailer may be identified by brand, based on the customizable elements available, and/or based on the capacity available. The retailer may include multiple facilities.

In various embodiments, the pastry types may include with photo, with predefined image, or with no graphic. The customizable elements may include two or more selected from the group of pastry base, a pastry filling, a pastry fondant, a pastry drizzle, and pastry toppings. The at least part of the system may be on a server system.

An example method comprises receiving a request for a customized pastry order for at least one customized pastry, identifying a retailer to fulfill the customized pastry order, identifying retailer resource information, the retailer resource information identifying customizable elements and capacity information available from the retailer, identifying pastry types available from the retailer, the pastry types including a with-graphic type or a without-graphic type, receiving user selection of a particular pastry type of the pastry types available from the retailer, if the particular pastry type identifies a with-graphic type, then presenting for user selection one or more options of each of one or more customizable elements available from the retailer, the one or more customizable elements being based on the retailer resource information and on the particular pastry type, receiving user selections, each user selection identifying at least one particular option for each of the one or more customizable elements available from the retailer, obtaining an image for presentation on the at least one customizable pastry, and initiating the customized pastry order based on the user selections and on the image.

An example computer readable medium may comprise executable instructions that are executable by a processor to perform a method. The method may comprise receiving a request for a customized pastry order for at least one customized pastry, identifying a retailer to fulfill the customized pastry order, identifying retailer resource information, the retailer resource information identifying customizable elements and capacity information available from the retailer, identifying pastry types available from the retailer, the pastry types including a with-graphic type or a without-graphic type, receiving user selection of a particular pastry type of the pastry types available from the retailer, if the particular pastry type identifies a with-graphic type, then presenting for user selection one or more options of each of one or more customizable elements available from the retailer, the one or more customizable elements being based on the retailer resource information and on the particular pastry type, receiving user selections, each user selection identifying at least one particular option for each of the one or more customizable elements available from the retailer, obtaining an image for presentation on the at least one customizable pastry, and initiating the customized pastry order based on the user selections and on the image.

DETAILED DESCRIPTION

According to some embodiments, systems and methods allow users to design and order customized pastries. Example pastries may include donuts, cupcakes, muffins, croissants, cookies, tarts, and/or other personalizable food items. Some embodiments may be configured to apply selectable and/or uploadable graphics such as photographs and/or stock images onto the pastries. Notably, pastry retailers may be limited by the resources they have on hand. Accordingly, some embodiments may support resource monitoring of pastry retailers to maintain awareness of the available options of the customizable elements of the pastries by the particular pastry retailers. It will be appreciated that a retailer may be one or more independent facilities, one or more individual facilities of a chain, one or more supermarkets, and/or combinations thereof.

In some embodiments, a server system cooperates with a web browser or application on a retailer system to provide a retailer interface for communication. The server system may receive from the retailer systems resource information regarding the retailer resources available for product customization. The available resources may include customizable elements such as available pastry shapes, available pastry bases, available fillings, available fondants, available drizzles, available toppings, available stock images, available image shapes, etc., and capacity (e.g., available pace of manufacture, maximum pastries possible, maximum possible filled pastries, maximum pasty customizable elements, etc.). Knowing the available resources, embodiments may offer customizable elements commensurate the with available resources.

Figure 1:
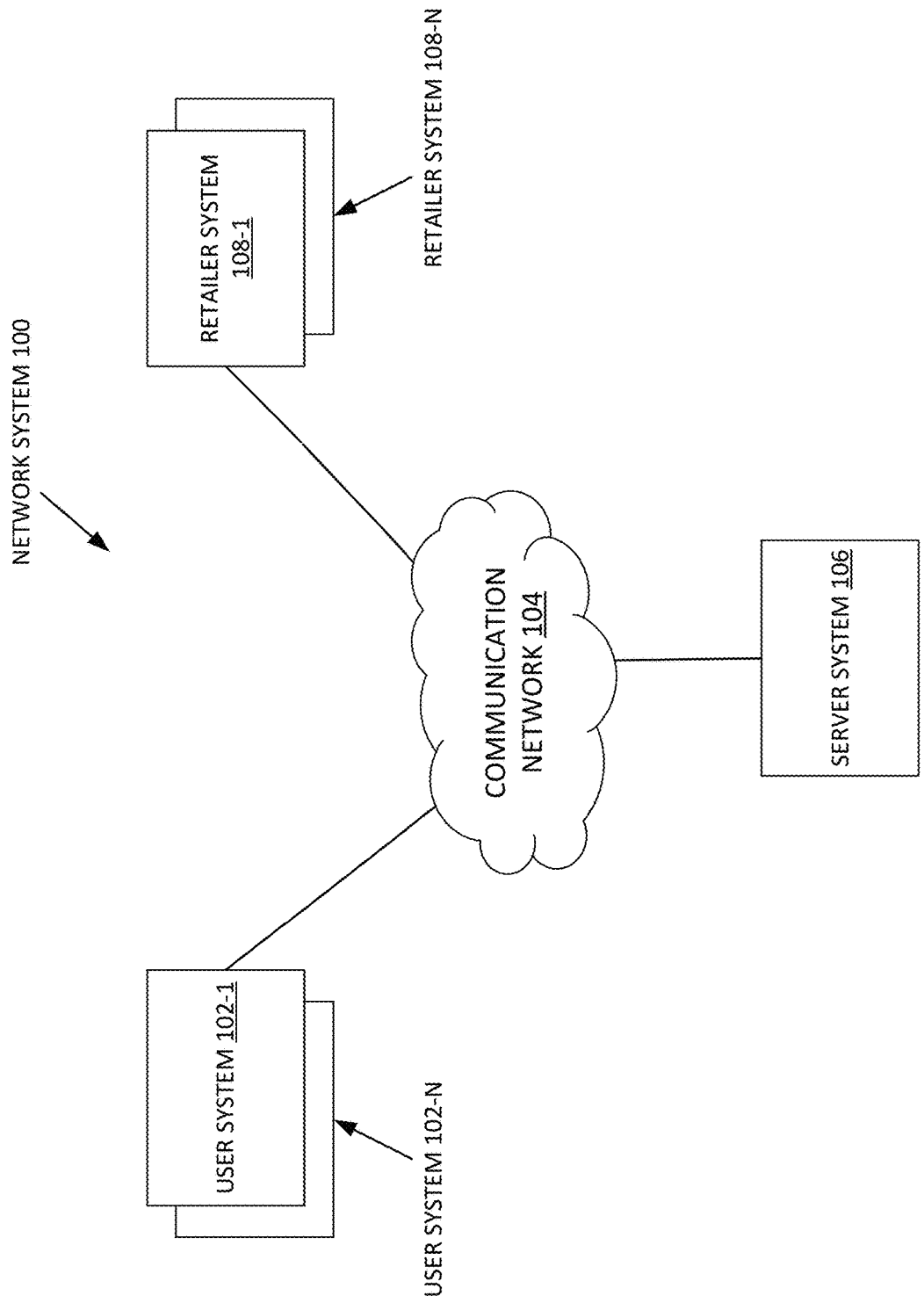
FIG. 1 depicts a block diagram of an example network system capable of providing product customization based on the resources available to the chosen retailer according to some embodiments.
Figure 18:
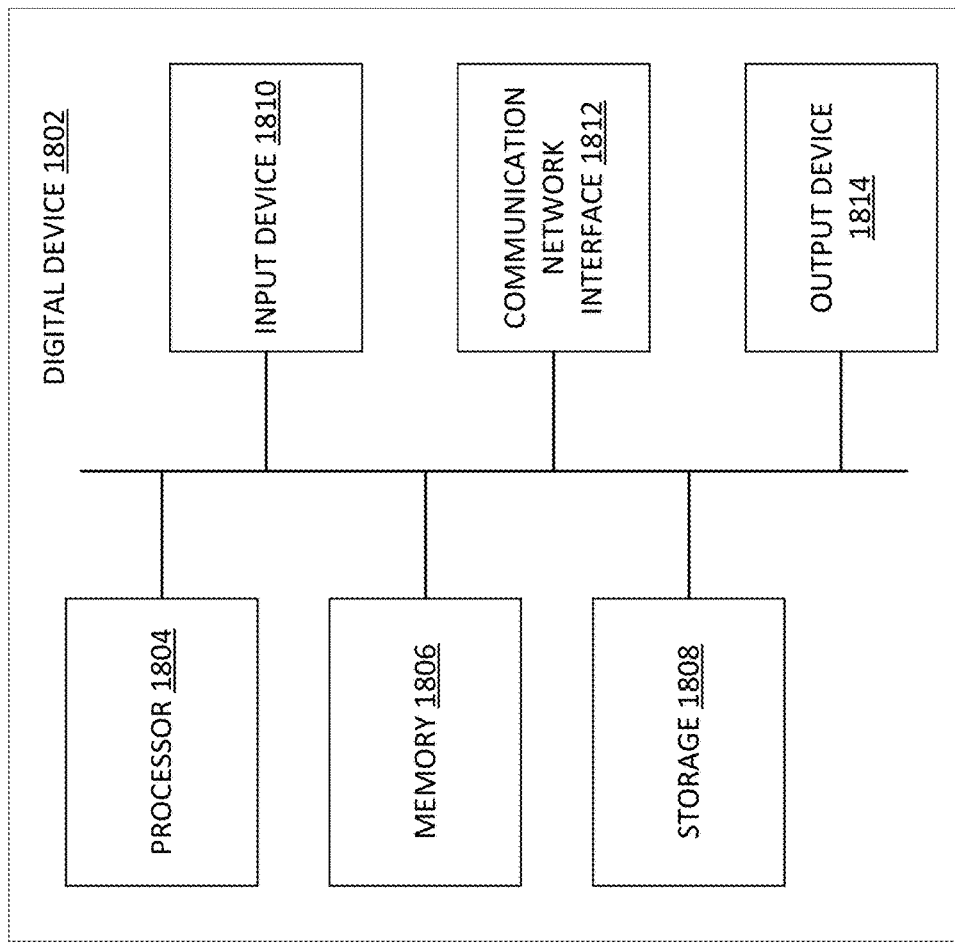
FIG. 18 depicts a block diagram of an example computing device according to some embodiments.

FIG. 1 depicts a block diagram of an example network system 100 capable of providing pastry customization to users based on resources available from pastry retailers. In this example, the network system 100 includes user systems 102-1 to 102-N (user system 102 generally), communication network 104, server system 106 and retailer systems 108-1 to 108-N (retailer system 108 generally). The user systems 102-1 to 102-N, server system 106, and retailer systems 108-1 to 108-N may each be or include any number of digital devices. A digital device is any device with a processor and memory. An example digital device is shown in FIG. 18.

In some embodiments, the user system 102 may be or include one or more mobile devices (e.g., smartphones, cell phones, smartwatches, tablet computers, or the like), desktop computers, laptop computers, and/or the like. A user can use the user system 102 to design and order one or more customized pastries.

In some embodiments, communication network 104 represents one or more computer networks (e.g., LAN, WAN, or the like). Communication network 104 may provide communication between any user system 120, the server system 106 and any retailer system 108. In some implementations, communication network 104 comprises computer devices, routers, cables, uses, and/or other network topologies. Communication network 104 may be wired and/or wireless. Communication network 104 may comprise the Internet, one or more networks that may be public, private, IP-based, non-IP based, and/or the like.

In some embodiments, users may interact with the user system 102 using, for example, a web browser or mobile application for customized pastry design (including selection of customizable elements) and for placing the order. The web browser or mobile application may load a different pastry creator interface for each retailer brand. For example, the pastry creator interface for Le Boulanger® may be different from that of Dunkin' Donuts®.

The pastry creator interface may present a series of customizable elements. In some embodiments, the customizable elements may be determined from retailer resource data and graphical images chosen by the user. That is, a user may be limited to select from options that a retailer is capable of fulfilling. In some embodiments, user selection of each customizable element may affect choices available of downstream customizable elements. For example, selection of a particular pastry shape may affect available fillings, availability of adding a photo, or availability of adding a particular photo shape. And, if a user wants to have a graphic applied to a pastry, a user may be limited to select from options that are capable of including a graphic generally or that are capable of including a particular graphic shape.

In some embodiments, a user of user system 102 may create a user account on server system 106. The user may upload user profile information to the server system 106 during a registration process. The user profile information may include user information (e.g., user ID, contact information, location information), payment information (e.g., credit card number, Bitcoin or some other form of on line payment), and preference information (e.g., previously saved pastry creations), etc.

In some embodiments, retailers may interact with the retail system 108 using, for example, a web browser or application on the retailer system 108. In some embodiments, retailers of retailer system 108 may send retailer information to the server system 106 for the creation of a retailer account. The retailer profile information include retailer information (e.g., retailer ID, contact information, location information, and/or retailer brand).

The server system 106 may also receive retailer resource data from a pastry retailer via the retailer systems 108. The retailer resource data may include available customizable elements, such as pastry shape, pastry base, pastry filling, pastry topping, pastry fondant, etc., that users can choose to create a personalized pastry. The retailer resource data may also include retailer capacities.

In some embodiments, any pastry retailer of the retailer system 108 may inform the server system 106 of changes in available retailer resource data. In some embodiments, the server system 106 may query one or all retailers for changes in retailer resource data, e.g., in real time, at a predetermined time interval (e.g., hourly, daily, weekly, etc.), at predetermined times, based on certain resource conditions (e.g., less than 10% red fondant remains at a particular retailer), and/or based on other trigger conditions. That way, the server system 106 may be made regularly aware of retailer resource data for each of the retailers.

In some embodiments, the retailer system 108 may inform the server system 106 of available local stock images provided by a particular retailer of retailer system 108, and may be made aware of updates and or changes in local stock images being made available (e.g., update of stock images to reflect upcoming holiday such as Christmas).

Figure 7:
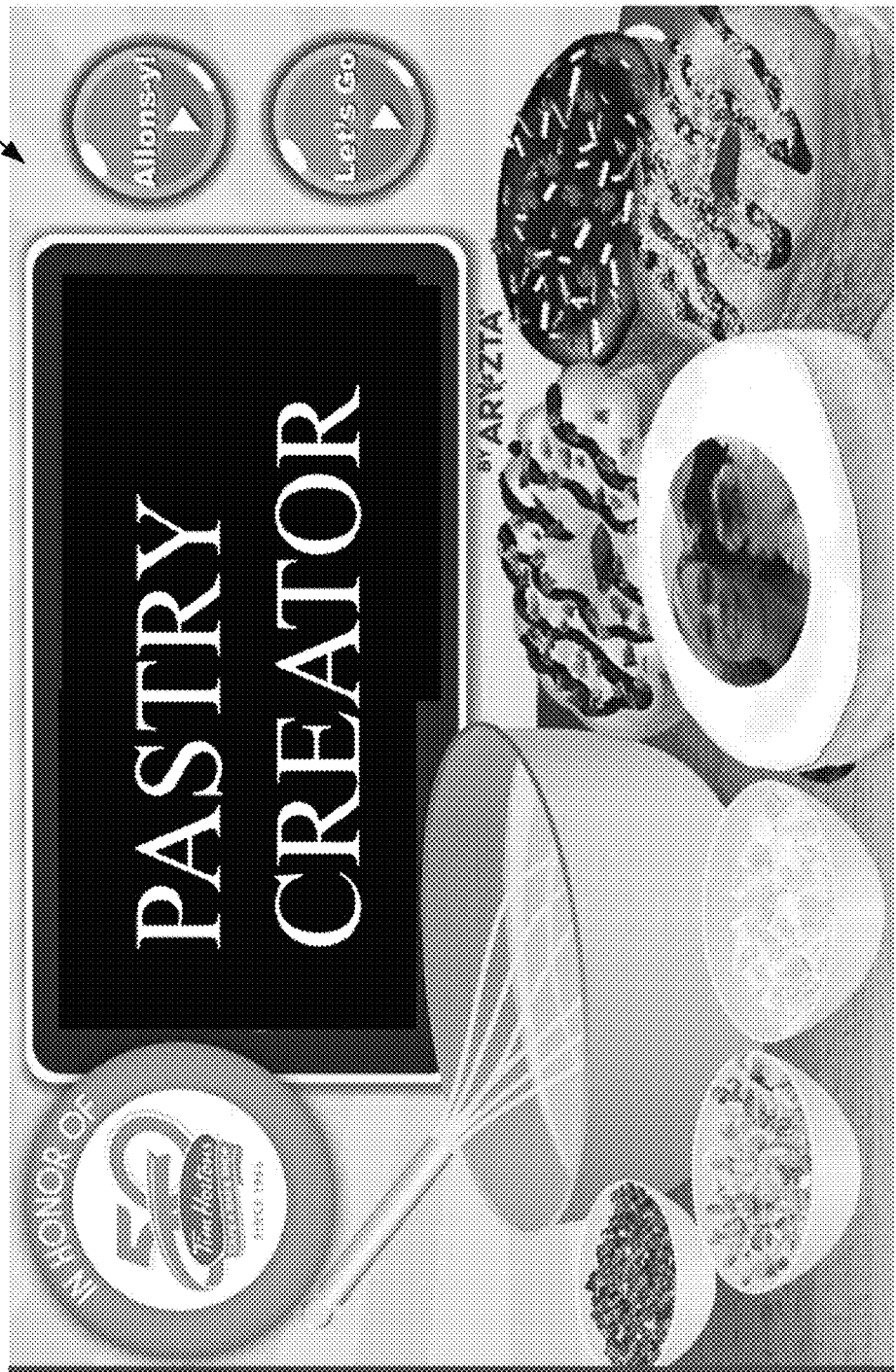
FIG. 7 depicts an example pastry creator interface according to some embodiments.
Figure 8:
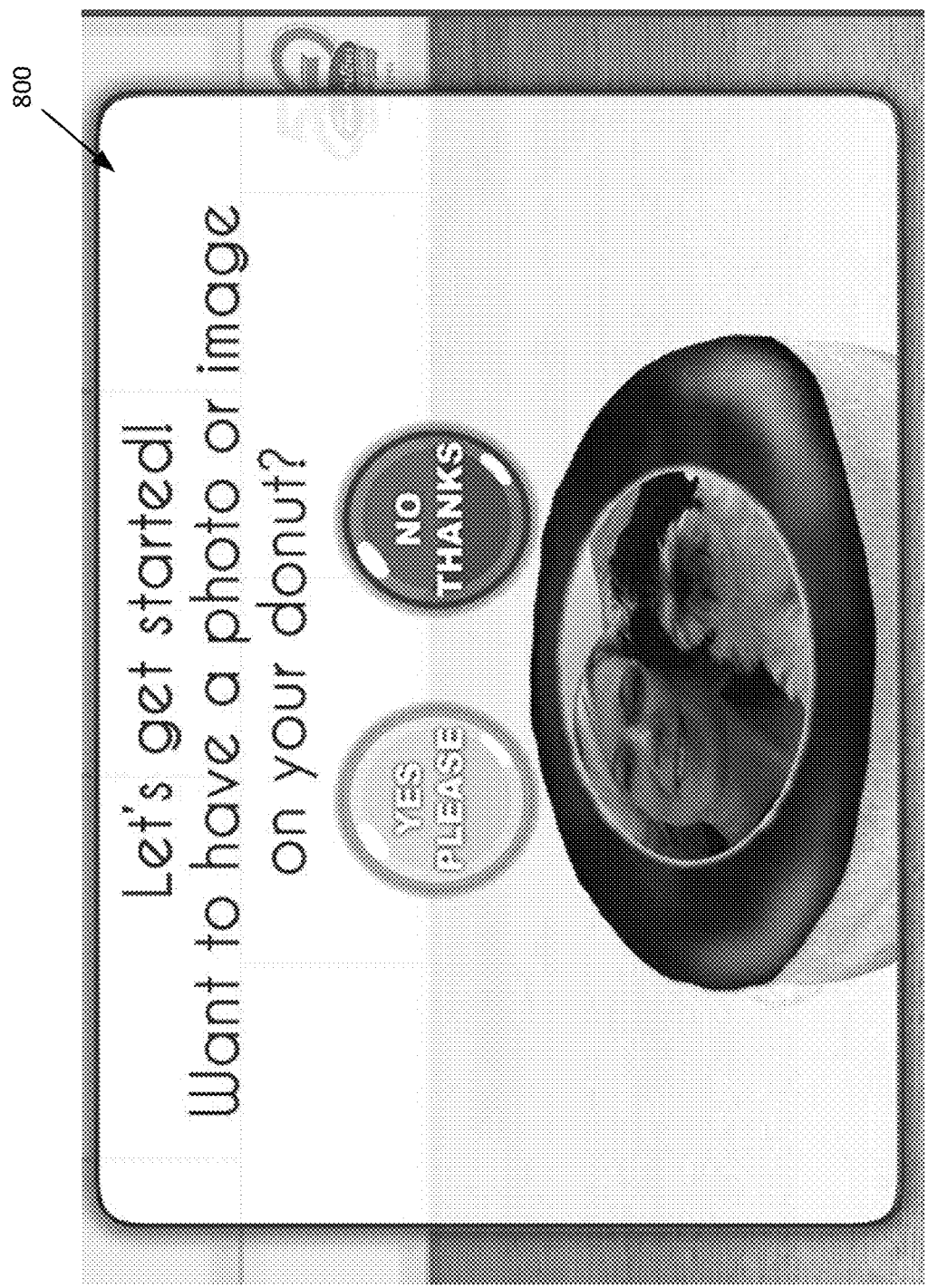
FIG. 8 depicts an example graphic decision interface according to some embodiments.
Figure 9:
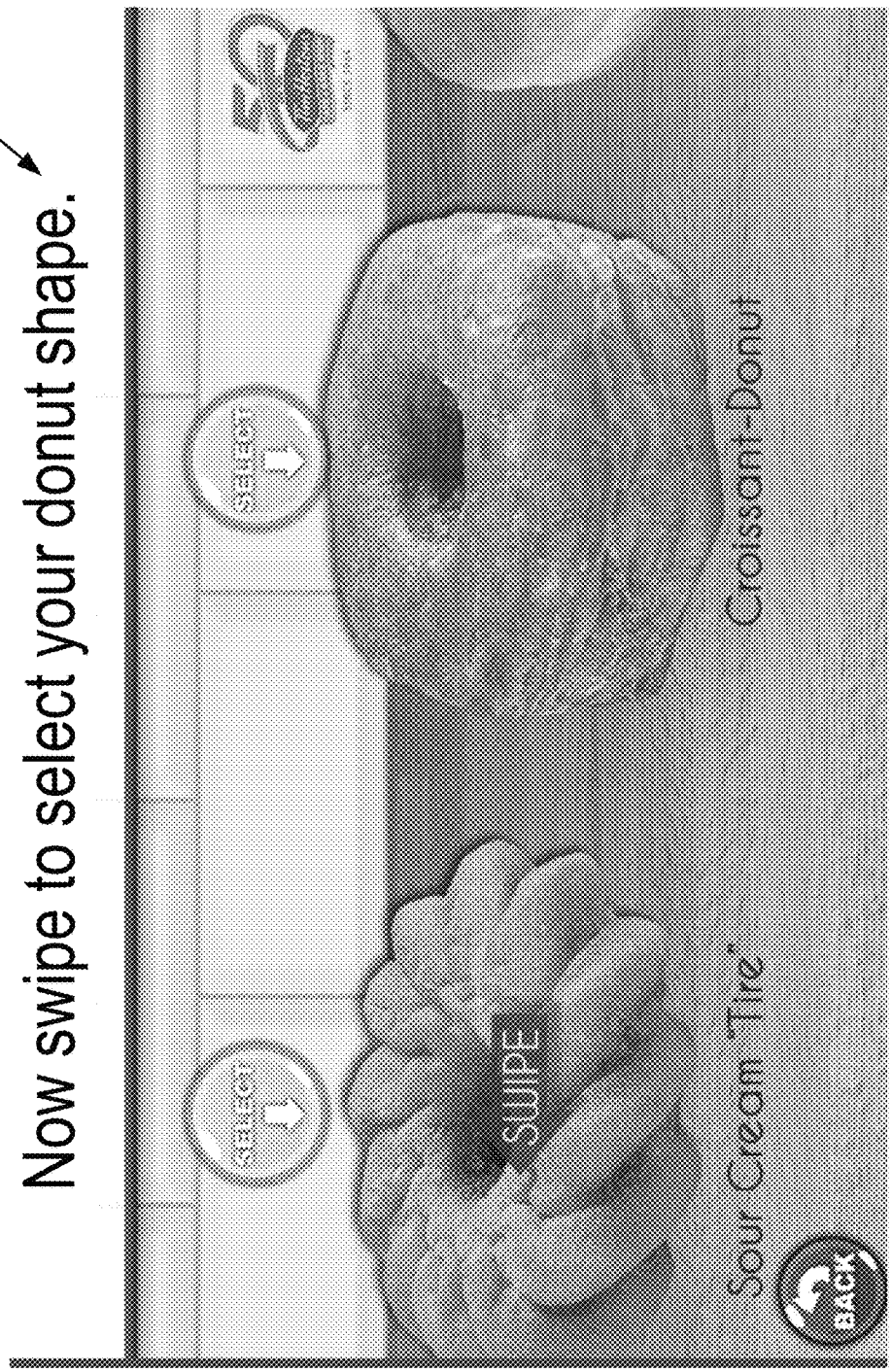
FIG. 9 depicts an example pastry shape decision interface according to some embodiments.
Figure 10:
FIG. 10 depicts an example pastry base decision interface according to some embodiments.
Figure 11:
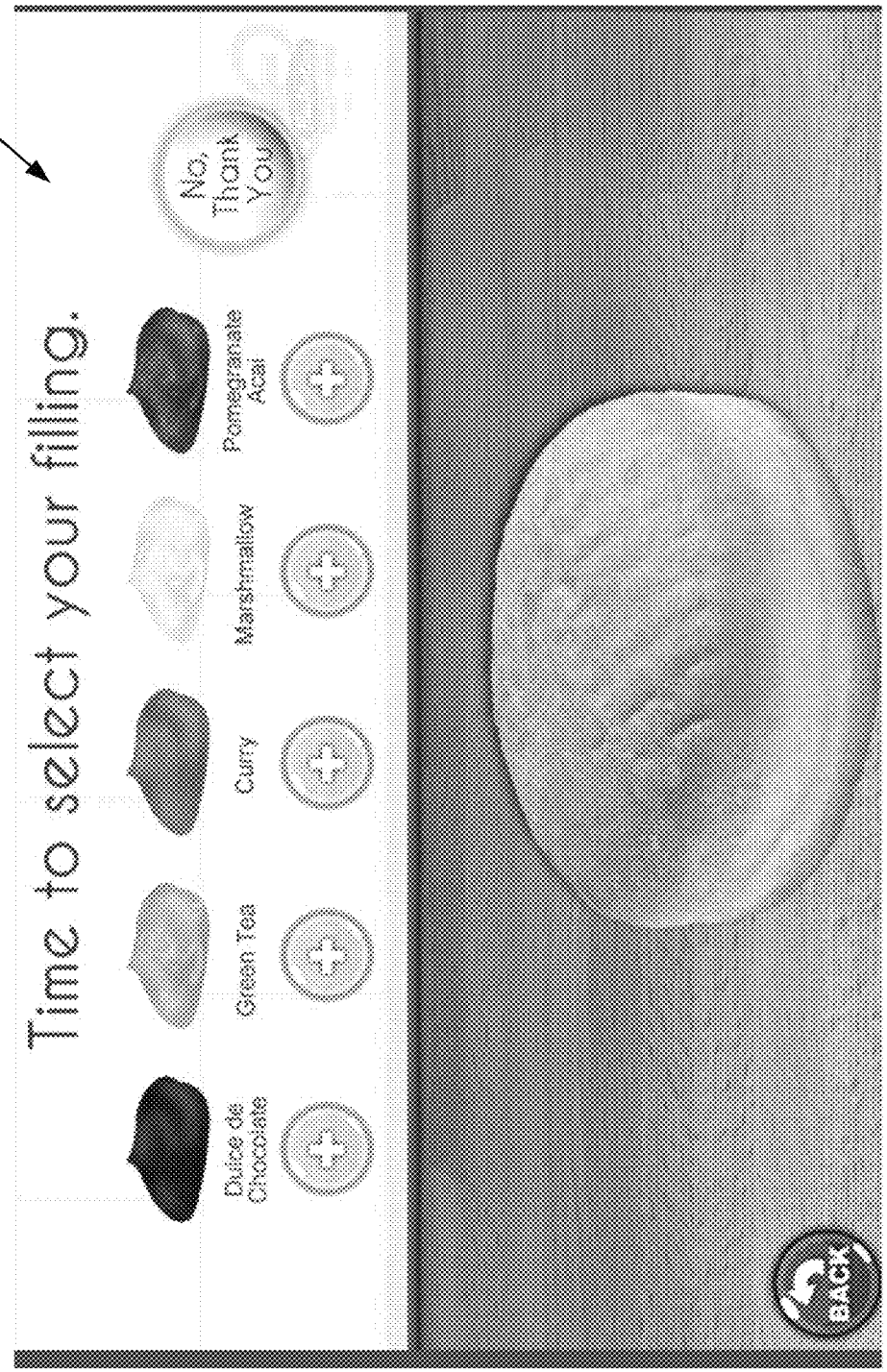
FIG. 11 depicts an example pastry filling decision interface according to some embodiments.
Figure 12:
FIG. 12 depicts an example fondant decision interface according to some embodiments.
Figure 13:
FIG. 13 depicts an example drizzle decision interface according to some embodiments.
Figure 14:
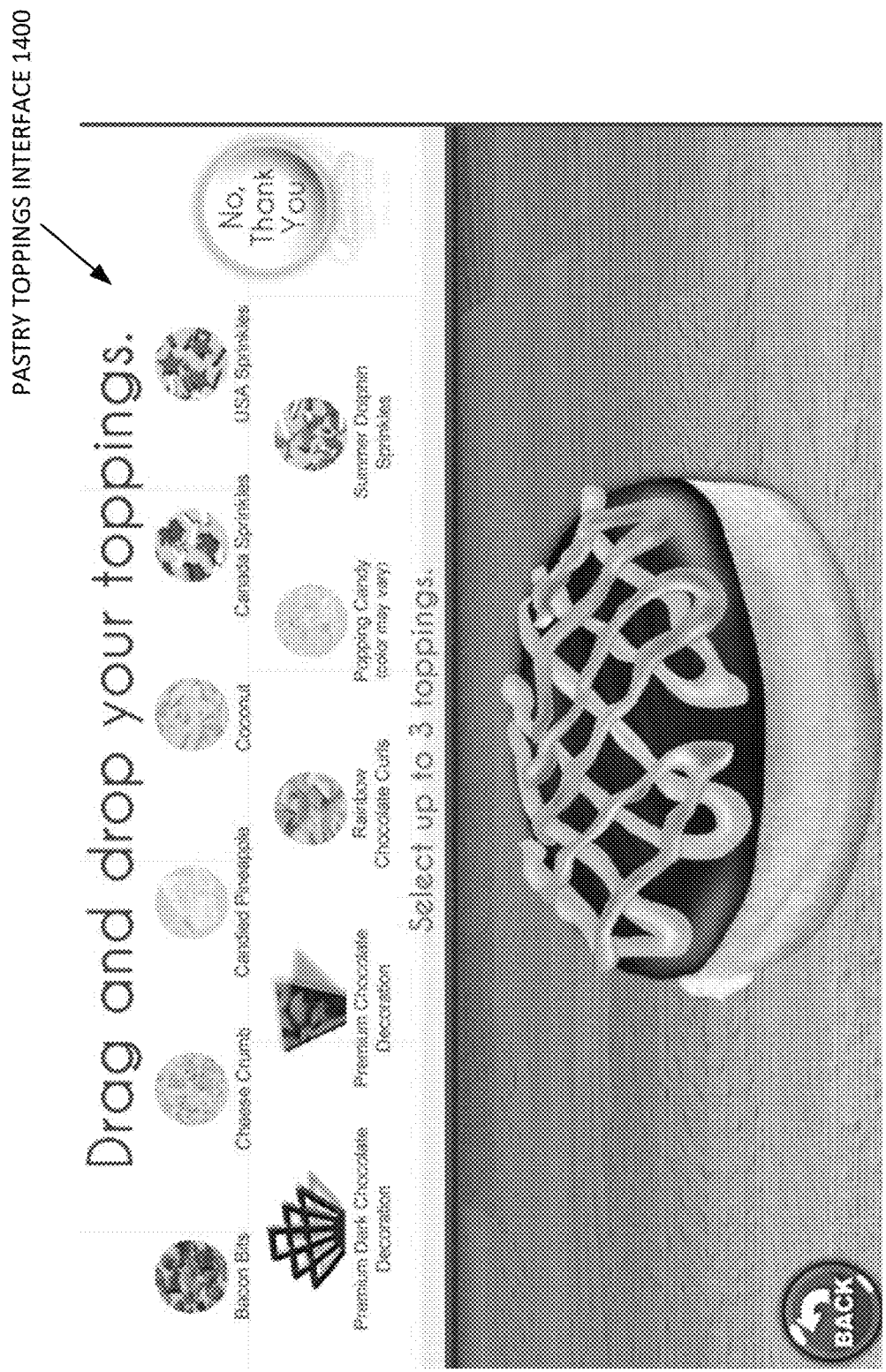
FIG. 14 depicts an example topping decision interface according to some embodiments.
Figure 15:
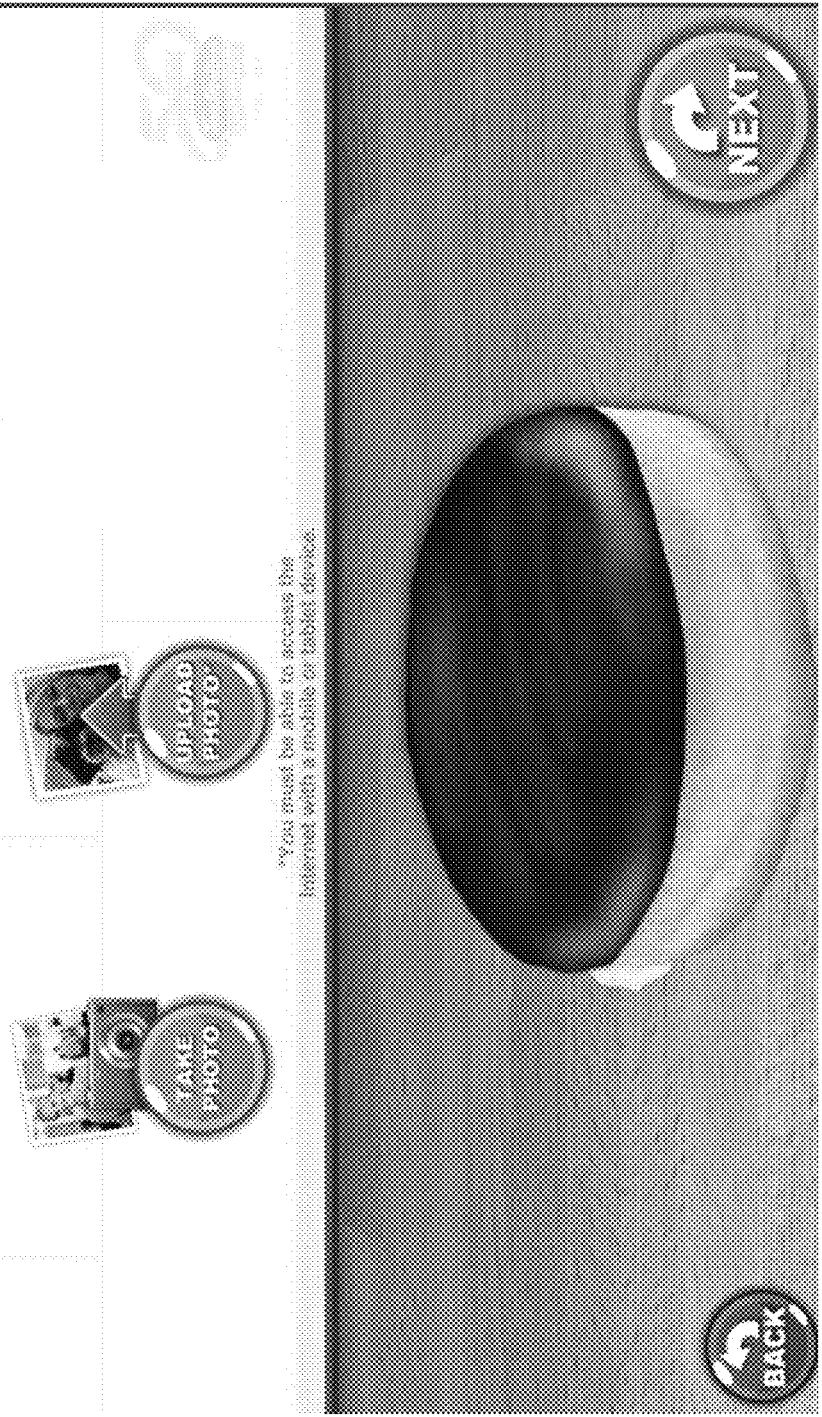
FIG. 15 depicts an example graphical image decision interface according to some embodiments.
Figure 16:
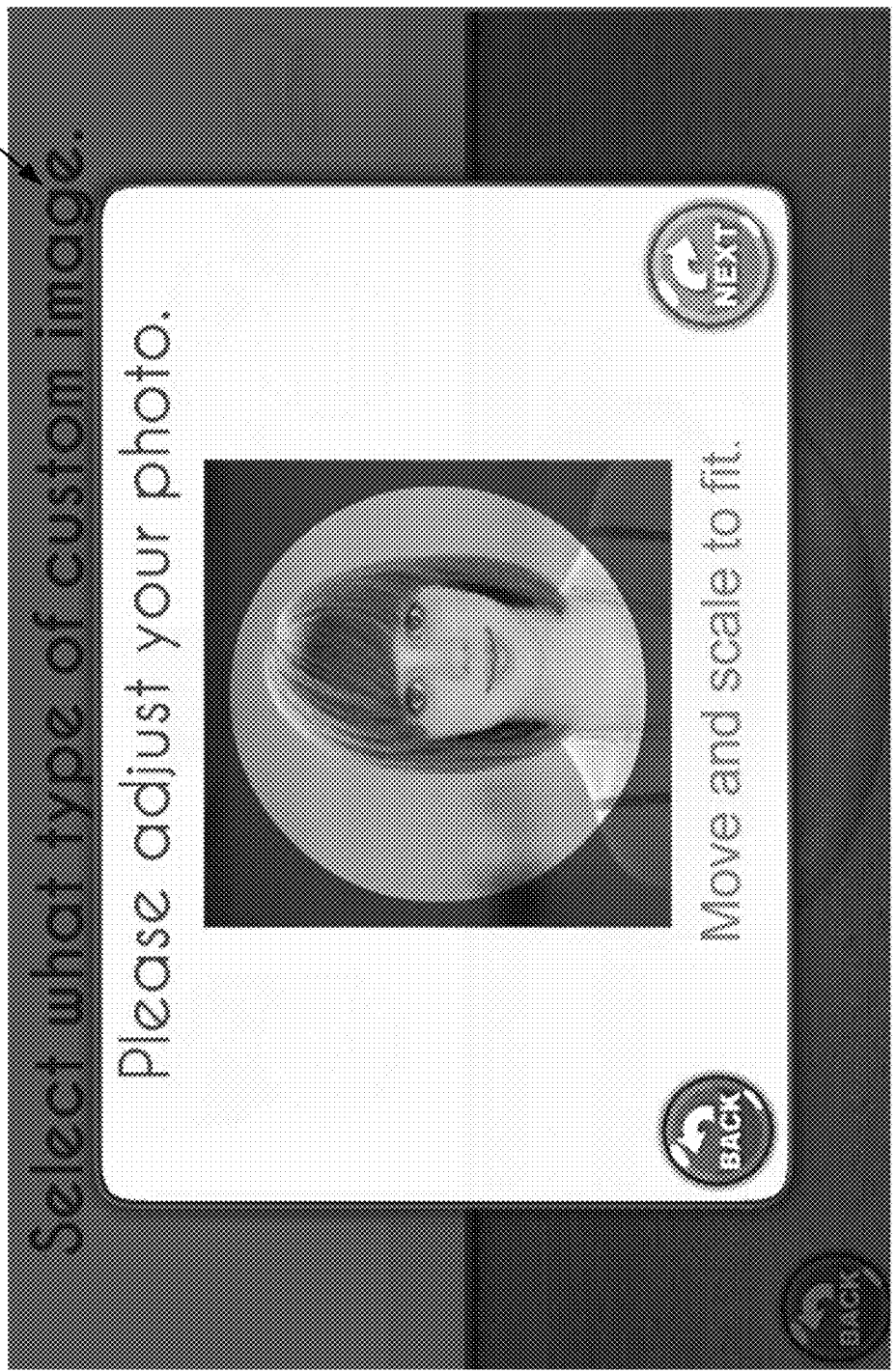
FIG. 16 depicts an example photo adjustment interface according to some embodiments.
Figure 17:
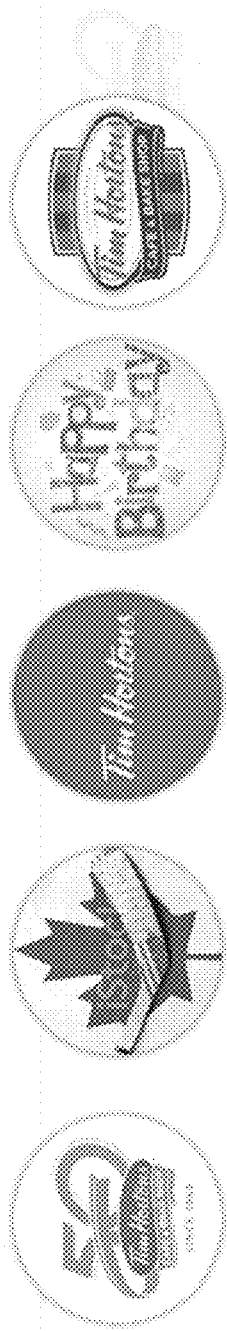
FIG. 17 depicts an example stock image decision interface according to some embodiments.
Figure 17:
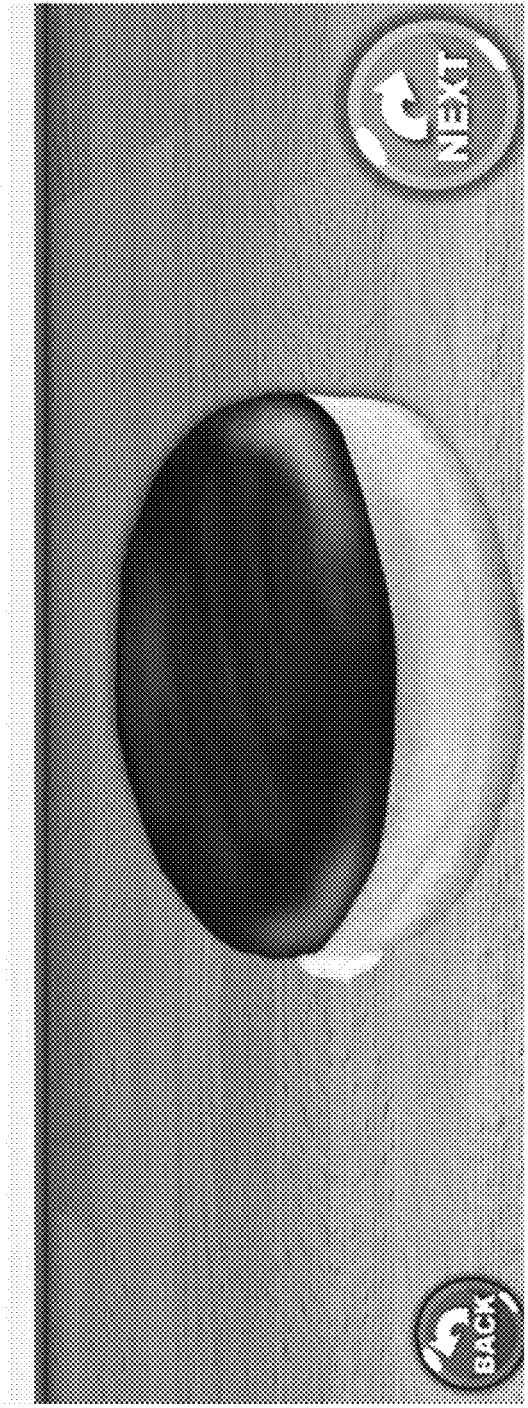

A user of user system 102 may launch a website or application to initiate design and ordering of a customized (personalized) pastry. The server system 106 may receive the request to launch a pastry creator interface. An example pastry creator interface can be seen in FIG. 7. The user system 102 may receive a search request for a retailer to fulfill a customized pastry order. Search criteria used to perform the search request may include geographical location of the user, a particular retailer, a particular brand, and/or preferred pastry attributes (e.g., red fondant and green tea filling), retailer capacity (such as retailers able to handle a large order in a short period of time).

In some embodiments, once a particular retailer has been chosen, the server system 106 might present a series of customizable elements in the pastry creator interface for the user to personalize a pastry order. In some embodiments, the customizable elements will be based on the retailer resource data of the particular retailer selected by the user. In some embodiments, the customizable elements may include the choice of whether or not to include one or more graphical images on the customized pastry order, and may include pastry attributes such as pastry shape, base, filling, fondant, drizzle, toppings, etc. As indicated above, user selection of any one of the series of customizable elements may affect the choices available on downstream customizable elements. For example, if the user chooses a customized pastry with a graphical image, certain subsequent customizable element(s), such as pastry shape, may be excluded and/or included. For example, a donut (or ring) shape may no longer be available. In some embodiments, the choices of pastry attributes available for any one or all of the customizable elements depend on the retailer resource data currently available from the selected retailer. For example, if the chosen retailer has run out of red fondant, the color red may no longer be a pastry attribute color choice available to the user.

Figure 2:
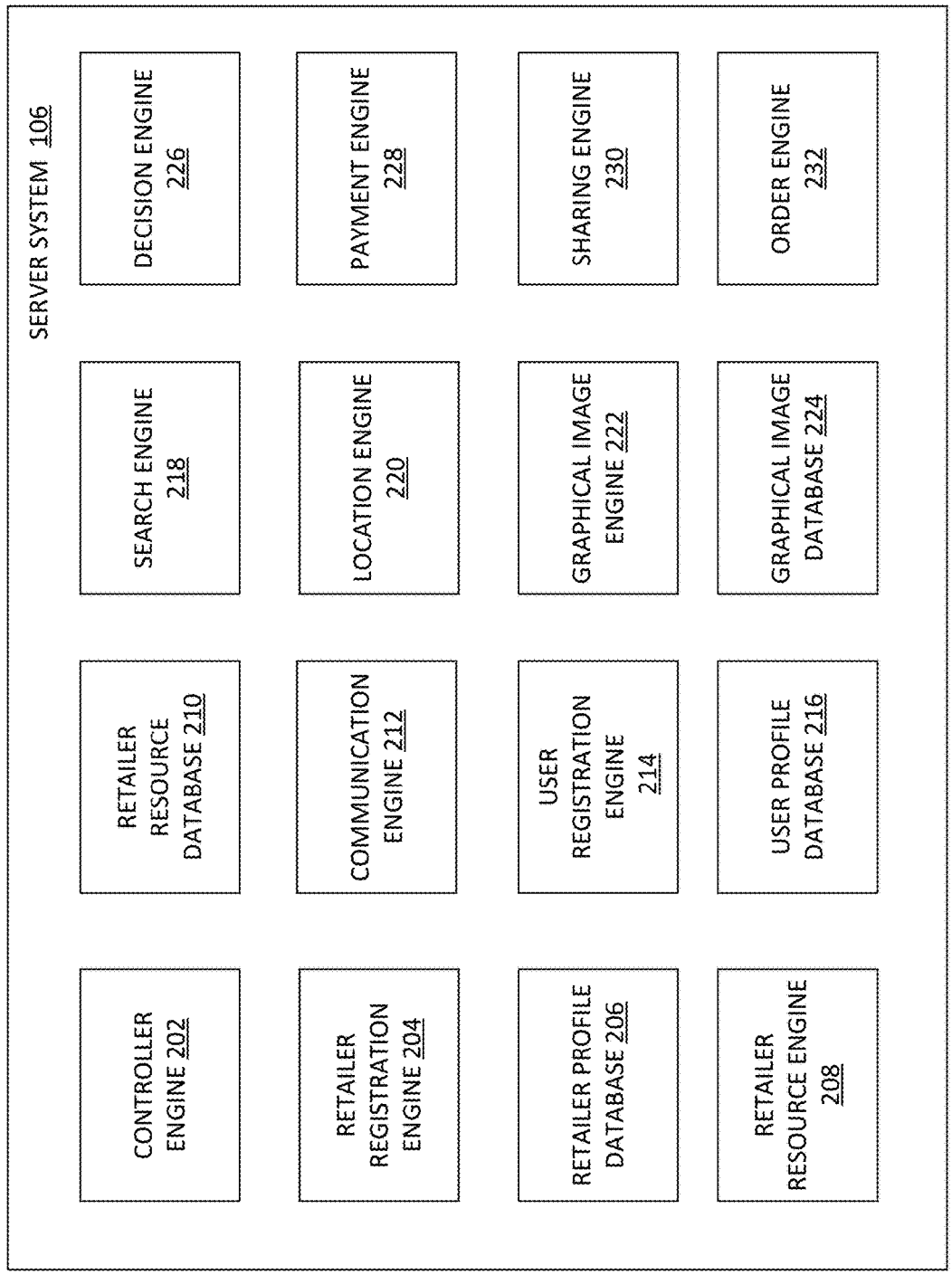
FIG. 2 depicts a block diagram of an example server system according to some embodiments.

FIG. 2 depicts a block diagram of an example server system 106 according to some embodiments. Server system 106 includes controller engine 202, retailer registration engine 204, retailer profile database 206, retailer resource engine 208, retailer resource database 210, communication engine 212, user registration engine 214, user profile database 216, search engine 218, location engine 220, graphical image engine 222, graphical image database 224, decision engine 226, payment engine 228, sharing engine 230 and order engine 232.

In some embodiments, controller engine 202 may be configured to manage one or more of the various engines shown in FIG. 2. For example, the controller engine 202 may be configured to respond to retailer registration requests by facilitating retailer registration engine 204 to create retailer accounts and to store retailer profiles in retailer profile database 206. Controller engine 202 may be configured to respond to user registration requests from any user of user system 102 by facilitating user registration engine 214 to create user accounts and to store user profiles in user profile database 216. In other embodiments, controller engine 202 may receive an update request from a retailer of a change in retailer resource data which would require an update to the retailer resource database 210. The controller engine 202 may be configured to request a retailer resource data update from one or all retailers upon satisfaction of certain trigger conditions, as noted herein.

In some embodiments, retailer registration engine 204 may be configured to create retailer accounts. A retailer system 108 sends retailer account information. Retailer profile database 206 receives the information. Retailer account information may include geographic location information, hours of operation, telephone number, bank account information, and other retailer information. The retail registration engine 204 may be configured to update retailer account information. When a new retailer registers, a retailer identifier (a login identifier), password, retailer resource data may be required. In various embodiments, retailers may be required to be registered and/or login to their account before receiving orders. The retailer registration engine 204 may be configured to manage storage of the retailer account information in the retailer profile database 206.

Retailer profile database 206 may be any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). Retailer profile database 206 may store the retailer account information.

In some embodiments, retailer resource engine 208 may be configured to create retailer resource accounts, one for each retailer of retailer system 108. The retailer of retailer system 108 sends retailer resource data to the server system 106. Retailer resource engine 208 may be configured to receive updates in response to satisfaction of certain trigger conditions, as noted herein. The retailer resource engine 208 may manage storage of the retailer resource data in the retailer resource database 210.

Retailer resource database 210 may be any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). Retailer resource database may store retailer resource data, which, in some embodiments, may include available customizable elements and capacities.

Communication engine 212 may be configured to send or receive requests or data between server system 106 and any one of users associated with user system 102, and between server system 106 and any one of retailers of retailer system 108.

In some embodiments, user registration engine 214 may be configured to create user accounts. The user registration engine 214 receives user account information from a user system 102. In various embodiments, user account information may include user information (e.g., contact information, location information, a user identifier, password information), payment information (e.g., credit card number, Bitcoin or some other form of on line payment), and user preferences (e.g., previously saved pastry creations). The user registration engine 214 may be configured to update user account information. When a new user registers, a user identifier (e.g., a login identifier), password, and payment information may be required. The user registration engine may be configured to manage storage of the user account information in the user profile database 216.

User profile database 216 may be any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). User profile database may store the user account information about each user associated with user system 102.

Graphical image engine 222 may be configured to manage stock images and manage storage of the stock images in graphical image database 224. In some embodiments, the graphical image engine 222 may receive local stock images from a particular retailer to be made available only from the retailer.

Graphical image database 224 may be any structure and/or structures suitable for storing digital images. Graphical image database may store stock images (i.e., predefined images). Example stock images may include images with celebratory messages such as "Happy Birthday" or seasonal themes such as Christmas trees which can be applied on the pastry, e.g., on top of the fondant.

In some embodiments, search engine 218 may be configured to perform a search request, submitted by a user, to fulfill a customized pastry order. As stated above, search criteria used to perform the search may include geographical location, particular retailer information, brand information, preferred pastry attributes, deadline information, etc. The search engine 218 will search the retailer profile database 206 and the retailer resource database 210 to identify a preferred or available retailer to fulfill the order.

Location engine 220 may be configured to evaluate geographic location information regarding a retailer of retailer system 108 and/or user of user system 102. For example, a user of user system 102 may submit a search request for a retailer that is located closest to the user's current position. In some embodiments, location engine 220 may utilize or receive GPS information, Wi-Fi signals, and/or cellular signals to determine or assist in determining geographic information needed to support the processes involving geographic location and/or distances herein.

Decision engine 226 may be configured to determine the retailer resource data and graphical images available from the chosen retailer and to manage user selections of the series of customizable elements. Decision engine 226 uses the retailer resource data to determine the series of customizable elements available. For example, if the user's chosen retailer does not have chocolate-base dough for any pastries, that flavor will not be presented as a choice of dough presented in the interface. In some embodiments, the decision engine 226 may cause the user selection of a customizable element to affect available downstream customizable elements. The decision engine 226 will manage available resources, nesting of available customizable elements, stock images available, capacities available, etc.

Order engine 232 may be configured to issue the customized pastry order, by sending the order to the selected retailer. In some embodiments, the order engine 232 may seek confirmation from the retailer that the retailer is capable of fulfilling the order, e.g., has enough of the resources to complete the order, has the capacity to fulfill the order in the time allotted, etc.

Payment engine 228 may be configured to facilitate payment of the customized pastry order. Server system 106 may receive payment information (e.g., credit card information) from user of user system 102 when the user registers a user account with server system 106. Server system 106 may send payments to the selected retailer of retailer system 108.

The sharing module 230 may be configured to receive permissions and enable users to share their customized or personalized order in an electronic mail (email) or on a social networking website such as Facebook® or Twitter®.

It will be appreciated that users may store their customized pastry orders in user profile database 216. The user may invite other users to access their customized orders using the sharing module 230. For example, the user may provide user identifiers to invite others to view the creations.

Figure 3:
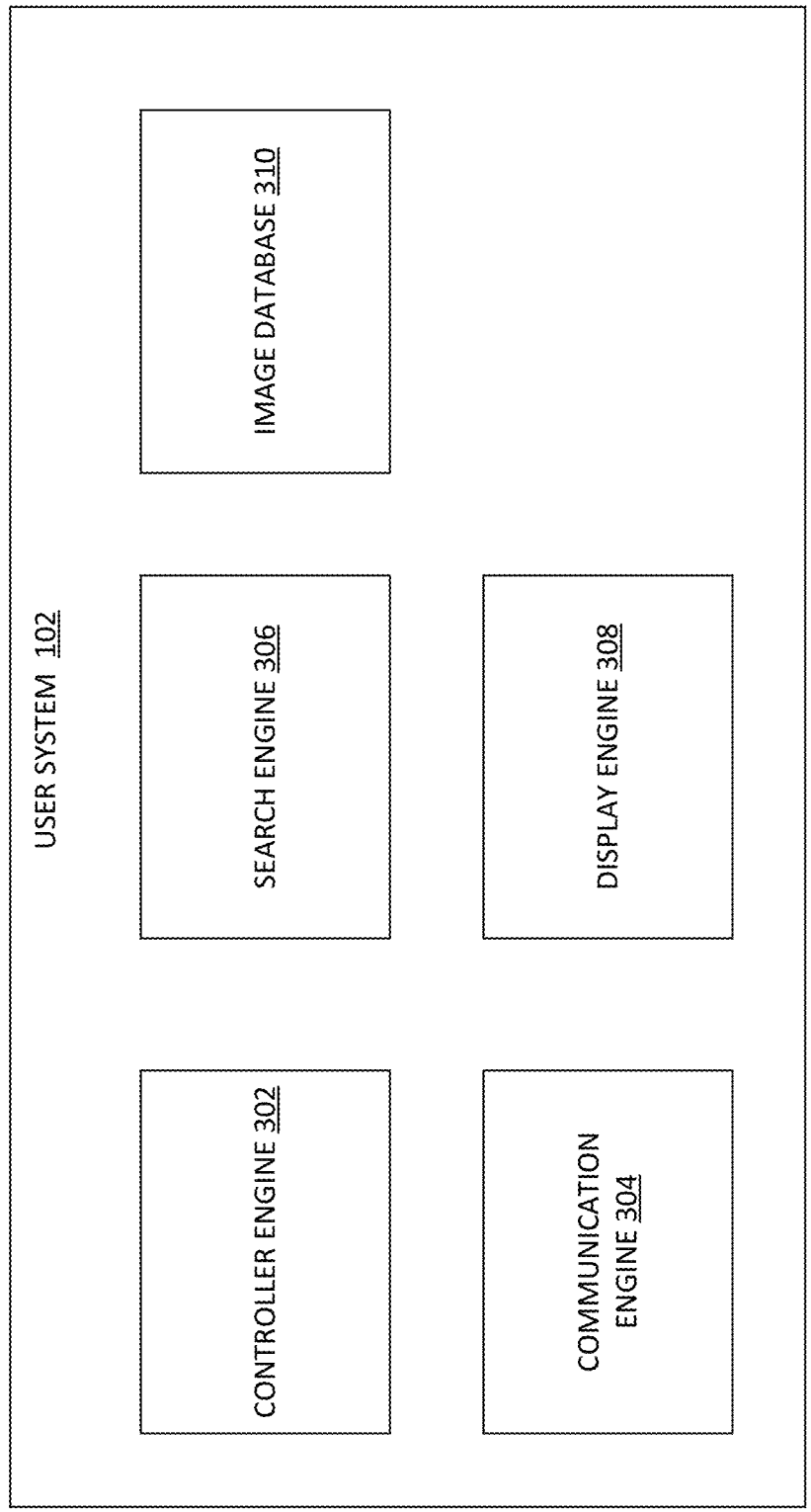
FIG. 3 depicts a block diagram of an example user system according to some embodiments.

FIG. 3 depicts a block diagram of an example user system 102 according to some embodiments. User system 102 includes controller engine 302, communication engine 304, browser or application 306, display engine 308, and photo database 310.

In some embodiments, controller engine 302 may be configured to manage one or all of the various engines shown in FIG. 3.

In some embodiments, communication engine 304 may be configured to send or receive requests or data with server system 106.

The browser or application 306 may be configured to present the interfaces to manage user registration, user searches for a pastry retailer, user selection of customizable elements, user payment, user order confirmation, user notification of order completion, etc. The browser or application 306 may be configured to present an interface to request registration information, including user profile information. The browser or application 306 may be provide an interface to obtain search criteria to the server system 106 to support selection of a retailer. The search criteria may include geographic location information, retailer information, retailer brand information and/or pastry attribute preferences. The browser or application 306 may be configured to present an interface to request user selection of customizable elements. The browser or application 306 may be configured to present an interface to select and/or crop a photo and/or stock image. The browser or application 306 may be configured to present an interface to facilitate payment. The browser or application 306 may be configured to present an interface to facilitate notification of order completion. The browser or application 306 may be configured to present other user interfaces. Examples of the interfaces are depicted in FIGS. 7-17.

In some embodiments, the display engine 308 may be configured to display the results of the retailer search in the form of a list or an electronic map.

In some embodiments, image database 310 may be any structure and/or structures suitable for storing digital images and/or photographs (e.g., an active database, a relational database, a self-referential database, a table, a matrix, an array, a flat file, a documented-orientated storage system, a non-relational No-SQL system, an FTS-management system such as Lucene/Solar, and the like).

Figure 4:
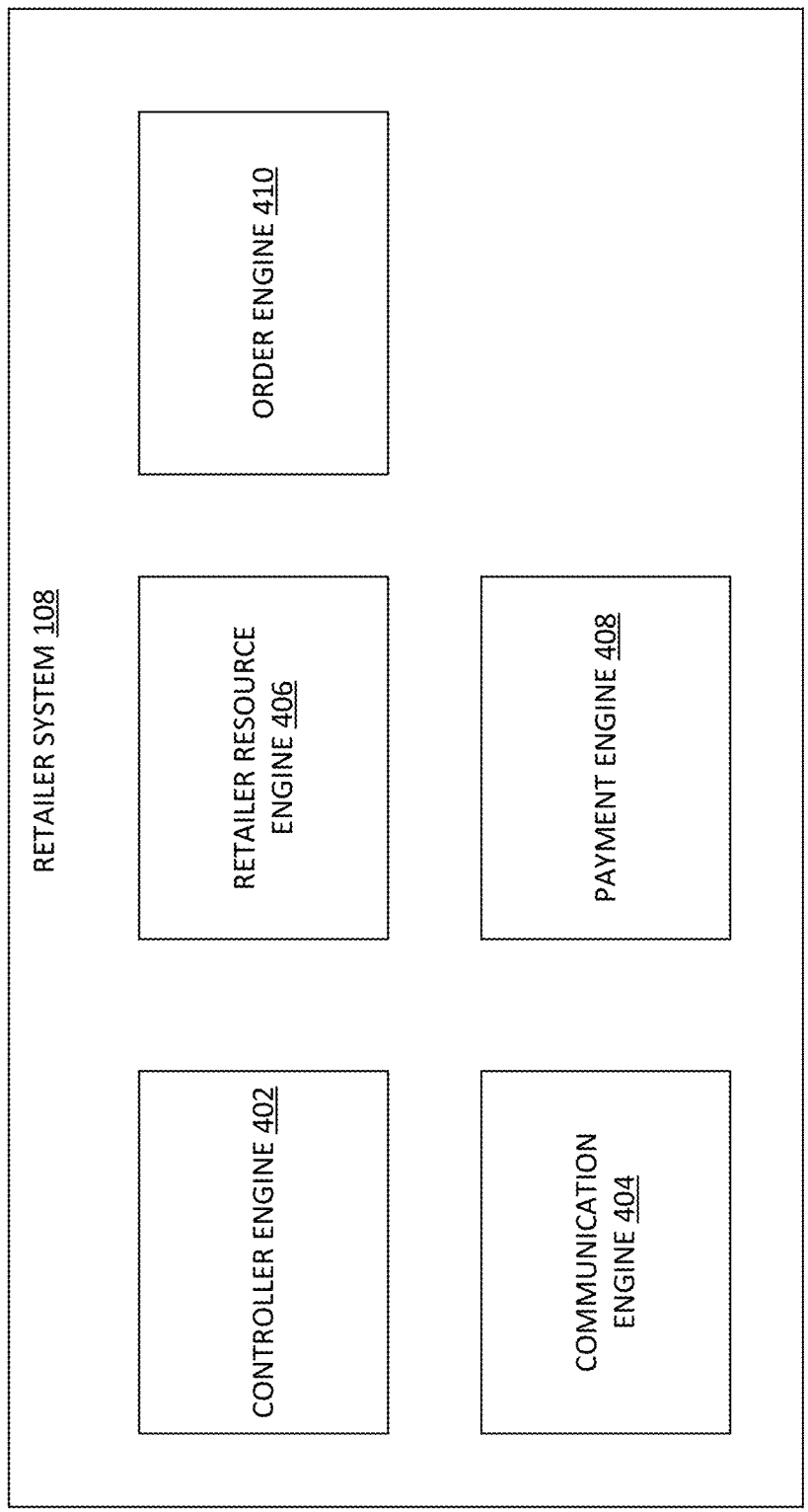
FIG. 4 depicts a block diagram of an example retailer system according to some embodiments.

FIG. 4 depicts a block diagram of an example retailer system 108 according to some embodiments. Retailer system 108 may include controller engine 402, communication engine 404, retailer resource engine 406, payment engine 408 and order engine 410.

In some embodiments, controller engine 402 may be configured to manage one or all of the various engines shown in FIG. 4. The controller engine 403 may be configured to facilitate retailer registration, retailer uploading of retailer resource data, receiving orders, etc. In one example, controller engine 403 may be configured to facilitate an update of retailer resource data from the retailer associated with the retailer system using retailer resource engine 406 and communication engine 404.

In some embodiments, communication engine 404 is configured to send retailer resource data to server system 106, or to receive customized and personalized orders or payment information from server system 106. Depending upon implementation-specific or other considerations, communication engine 404 may send or receive requests or data through a connect, all or a portion of which may be a wireless connection.

Retailer resource engine 406 may be configured to send retailer resource data to retailer resource database 210 of server system 108. In some embodiments, retailer resource engine 406 may be configured to send retailer resource data to retailer resource database 210 in real time, at a predetermined time interval (e.g., hourly, daily, weekly, etc.), when levels of certain retailer resource fall below a threshold or when additions or updates need to be made to retailer resource data.

In some embodiments, payment engine 408 may be configured to receive on line payment of the customized or personalized order. Retailer system 108 may receive payment information from server system 106 before the customized or personalized pastry order is submitted to the chosen retailer. In some embodiments, server system 106 may receive payment information from user of user system 102 when the user registers the user account with server system 106.

In some embodiments, order engine 410 may be configured to receive the customized pastry order from decision engine 226 of server system 106.

Figure 5A:
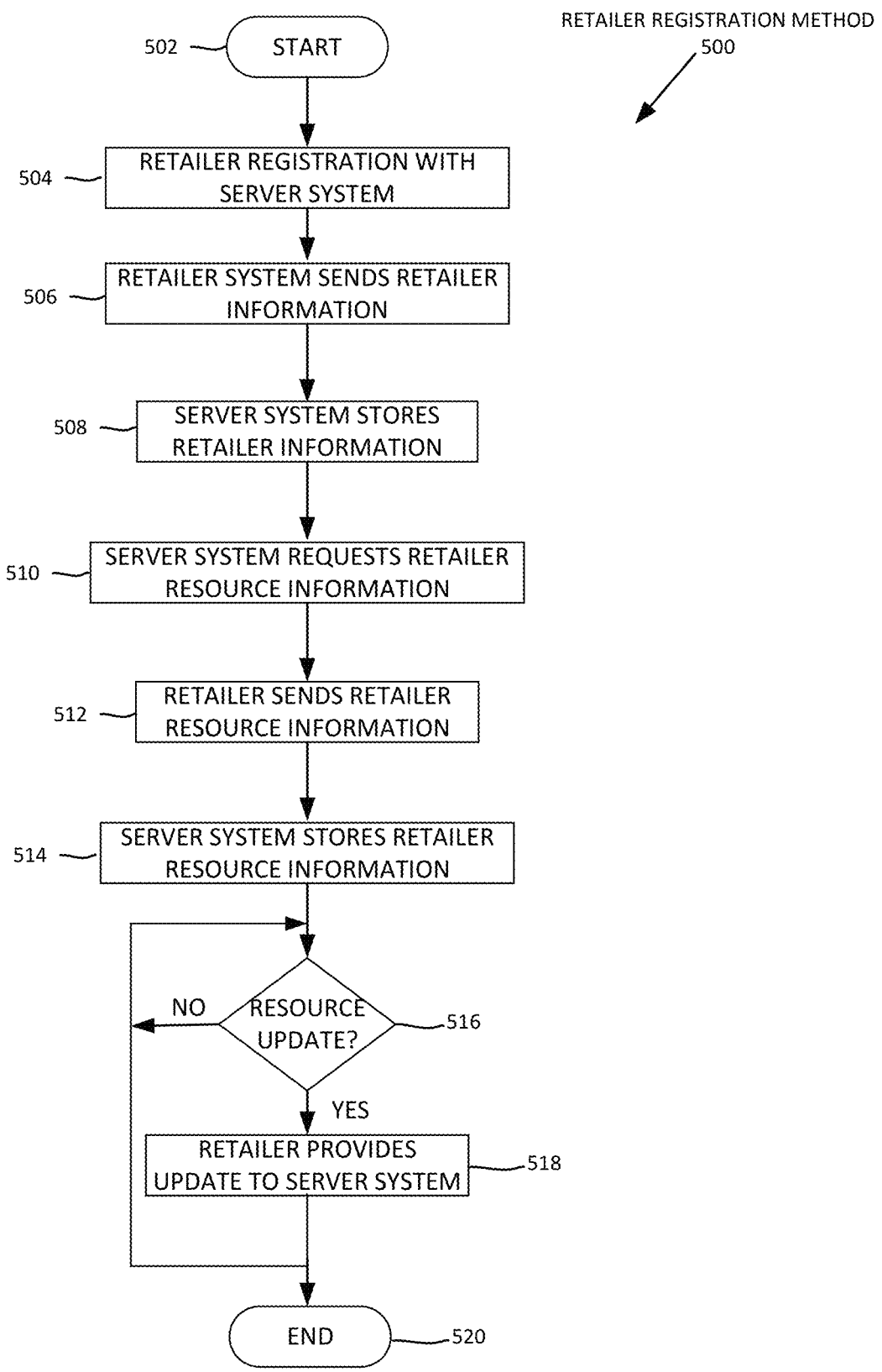
FIG. 5A depicts a flowchart of a retailer registration method according to some embodiments.

FIG. 5A is a flowchart illustrating a retailer registration method 500 according to some embodiments. Step 502 depicts the start of retailer registration method 500.

In step 504, a retailer system 108 sends a registration request to server system 106 to request registration of a new retailer. Communication engine 404 of retailer system 108 sends the retailer registration request to server system 106. Communication engine 212 of server system 106 receives the request. Controller engine 202 responds to the retailer registration request by facilitating retailer registration engine 204 to create a retailer account.

In step 506, communication engine 404 sends retailer account information to the server system 206, and retailer profile database 206 receives the information.

In step 508, retailer profile database 206 stores the retailer account information.

In step 510, retailer resource engine 208 sends a resource request to request retailer resource information from the retailer system 108. Communication engine 212 sends the resource request. Communication engine 404 receives the request. Controller engine 402 responds to the resource request by facilitating retailer resource engine 406 to send retailer resource information.

In step 512, the retailer resource engine 406 sends the retailer resource information to the retailer resource engine 208.

In step 514, the retailer resource engine 208 manages storage of the information in the retailer resource database 210.

In step 516, the server system 106 sends a request for updated resource data to the retailer system 108. The retailer resource engine 208 may send a query to resource engine 406 to determine if the retailer resource information requires updating. If an update to retailer resource database 210 is not required, retailer resource engine 208 may send a subsequent query at a later time, e.g., upon satisfaction of a trigger condition. It will be appreciated that the retailer system 108 may initiate updating, instead of the server system 106.

If an update to retailer resource database 210 is required, the retailer resource engine 406 in step 518 may send an update to retailer resource engine 208. Retailer resource engine 208 receives the update and subsequently manages storage of the update in retailer resource database 210. Retailer resource database 210 receives the update of retailer resource and stores the update information. Method 500 then ends in step 520.

Figure 5B:
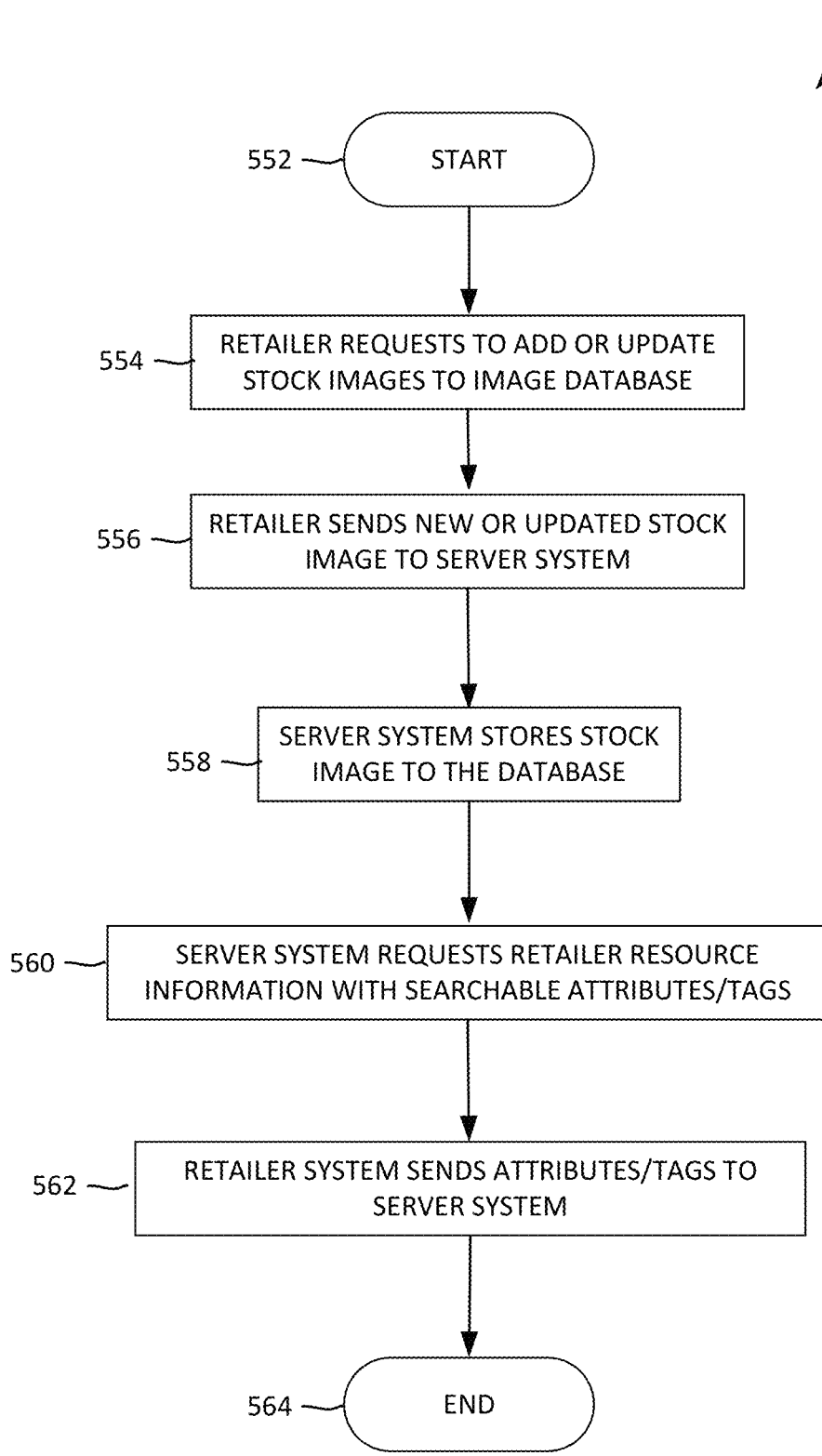
FIG. 5B depicts a flowchart of a local stock image upload method according to some embodiments.

FIG. 5B is a flowchart depicting a local stock image upload method 550 according to some embodiments. Step 552 depicts the start of stock image upload method 550.

In step 554, a retailer system 108 sends a request to server system 106 to add or update local stock images on the server system 106. Communication engine 404 sends a stock image upload request to server system 106. Communication engine 212 receives the request from retailer system 108. Controller engine 202 responds to the stock image upload request by facilitating graphical image engine 222 to update graphical image database 224. In some embodiments, stock images may contain celebratory messages such as "Happy Birthday" or seasonal themes such as Christmas trees.

In step 556, the retailer system 108 uploads the new or updated local stock images to server system 106. The communication engine 404 sends the new or updated local stock image to server system 106. Communication engine 212 receives the new or updated local stock image.

In step 558, the graphical image engine 222 manages the storage of the new or updated local stock image in the graphical image database 224.

In step 560, the server system 106 requests retailer resource information and search attributes/tags associated with the new or local stock image, so that the user can identify it and the server system 106 can monitor retailer capacity. The communication engine 212 sends the request to retailer system 108.

In step 562, the retailer system 108 sends the retailer resource information and attributes/tags to the server system 106. More particularly, the communication engine 404 sends the retailer resource information and attributes/tags associated with the new or updated local stock image to the server system 106. Communication engine 212 receives the retailer resource information and attributes/tags. The graphical image engine 222 manages the storage of the retailer resource information and attributes/tags in the graphical image database 224 in association with the new or updated local stock image.

In step 564, the stock image upload method ends.

Figure 6A:
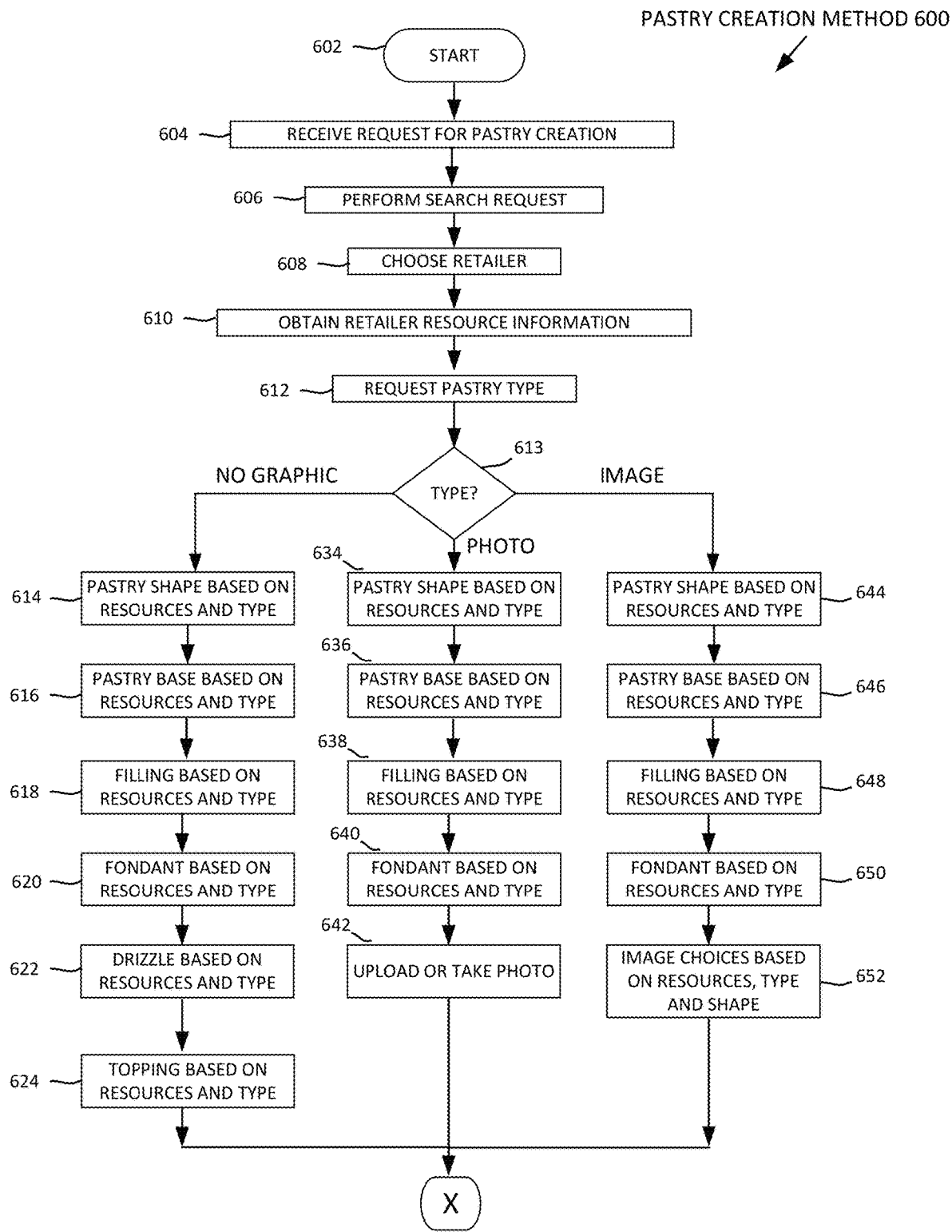
FIG. 6A depicts a flowchart of a pastry creation method according to some embodiments.

FIG. 6A is a flowchart illustrating a pastry creation method 600 according to some embodiments.

Step 602 depicts the start of pastry creation method 600.

In step 604, the browser or application 306 of a user system 102 launches a website or application to create a customized pastry. The browser or application 306 receives and presents pastry creator interface, an example of which can be seen in FIG. 7.

In step 606, the browser or application 306 of the user system 102 receives selection to perform a search for a retailer of retailer system 108 to fulfill the customized pastry order. For example, a user may perform a search request by calling a search function, for example, clicking on a "Search Retailer" button (not shown). In response, the browser or application 306 may present a search interface. The browser or application 306 of the user system 102 may receive search criteria. As indicated herein, the criteria may include a geographic location, a retailer identification, a retailer brand, and/or any preferred pastry attributes/tags. The browser or application 306 sends the search request. The search engine 218 of the server system 106 receives the search request and performs a search to identify a preferred retailer. The search engine 218 may cooperate with the location engine 220 (e.g., to evaluate location and/or distances), retailer profile database 206 (e.g., to identify retailer locations) and retailer resource engine 208 (e.g., to confirm available resources to meet the user preferences and/or quantities). Communication engine 212 sends the search results to the user system 102. Display engine 308 may be configured to display the search results. The search result may include a list, map or other format of retailers that match or closely match the user's search request.

In step 608, the user system 102 receives selection of a retailer from the presented search results. Controller engine 302 sends the retailer selection to the server system 106.

In step 610, the decision engine 226 receives the retailer selection and obtains retailer resource information for the selected retailer from the retailer resource database 210, and determines the series of customizable elements available to the user from it.

In step 612, after the decision engine 226 determined the series of customizable elements available, the decision engine 226 sends the first of a series of requests for customizable selections to the user. In some embodiments, the decision engine 226 may first request that the user decide whether he wants to include a graphic (whether a photo, a stock image, a message, etc.) onto the customized pastry. An example of this interface can be seen in FIG. 8. In some embodiments, a photo may include a digital image created or uploaded by the user. An image may include a graphical image stored in graphical image database 224. As noted above, each selection by the user may affect the availability of downstream customizable elements. For example, if the user chooses a customized pastry with a graphical image, certain downstream customizable elements may be made no longer available and/or may be made available.

As shown in step 613, the user system 102 presents three possible alternatives, namely, with no graphic, with a photo or with a stock graphic image. Based on the selection, the available options may differ or may be the same. In the current embodiment, the options differ.

If the user selects no graphic in step 613, then the method 600 proceeds to step 614. In step 614, the decision engine 226 determines that the next customizable element is pastry shape, and sends the pastry shapes available for the selected retailer (e.g., those pastry shapes available based on the resources available and the type of pastry selected). Decision engine 226 sends the pastry shapes to display engine 308, which presents an interface requesting user selection of a pastry shape, an example of which can be seen in FIG. 9. As shown in pastry shape interface 900, the user is presented with two pastry shapes. The user system 102 enables user selection of a desired pastry shape. Communication engine 304 sends the shape selection to decision engine 226. Decision engine 226 receives the shape selection and determines the next customizable element.

In step 616, decision engine 226 determines that the next customizable element is pastry base, and sends the pastry bases available for the selected retailer. The pastry bases available may depend on the pastry resources available, the pastry type selected (in this case with no graphic) and the prior customizable elements selected (in this case shape). The decision engine 226 sends the pastry bases to the display engine 308. The display engine 308 receives the pastry bases available and displays them for user selection, an example of which can be seen in FIG. 10. As shown in the pastry base interface 1000, the user is presented with two pastry bases. The user system 102 enables user selection of a desired pastry base. Communication engine 304 sends the base selection to the decision engine 226. The decision engine 226 receives the base selection and determines the next customizable element.

In step 618, decision engine 226 determines that the next customizable element is pastry filling, and sends the pastry fillings available for the selected retailer. The pastry fillings available may depend on the pastry resources available, the pastry type selected and the prior customizable elements selected (in this case shape and/or base). The decision engine 226 sends the pastry fillings to the display engine 308. The display engine 308 receives the pastry fillings available and displays them for user selection, an example of which can be seen in FIG. 11. As shown in the pastry filling interface 1100, the user is presented with five pastry fillings and a no-filling option. The user system 102 enables user selection of a desired pastry filling. Communication engine 304 sends the filling selection to the decision engine 226. The decision engine 226 receives the filling selection and determines the next customizable element.

In step 620, decision engine 226 determines that the next customizable element is pastry fondant, and sends the pastry fondants available for the selected retailer. The pastry fondants available may depend on the pastry resources available, the pastry type selected and the prior customizable elements selected (in this case shape, base and/or filling). The decision engine 226 sends the pastry fondants to the display engine 308. The display engine 308 receives the pastry fondants available and displays them for user selection, an example of which can be seen in FIG. 11. As shown in the pastry fondants interface 1200, the user is presented with four pastry fondants and a no-fondant option. The user system 102 enables user selection of a desired pastry fondant. Communication engine 304 sends the fondant selection to the decision engine 226. The decision engine 226 receives the fondant selection and determines the next customizable element.

In step 622, decision engine 226 determines that the next customizable element is pastry drizzle, and sends the pastry drizzles available for the selected retailer. The pastry drizzles available may depend on the pastry resources available, the pastry type selected and the prior customizable elements selected (in this case shape, base, filling and/or fondant). The decision engine 226 sends the pastry drizzles to the display engine 308. The display engine 308 receives the pastry drizzles available and displays them for user selection, an example of which can be seen in FIG. 13. As shown in the pastry drizzle interface 1300, the user is presented with three pastry drizzle options and a no-drizzle option. The user system 102 enables user selection of a desired pastry drizzle. Communication engine 304 sends the drizzle selection to the decision engine 226. The decision engine 226 receives the drizzle selection and determines the next customizable element.

In step 624, decision engine 226 determines that the next customizable element is pastry toppings, and sends the pastry toppings available for the selected retailer. The pastry toppings available may depend on the pastry resources available, the pastry type selected and the prior customizable elements selected (in this case shape, base, filling, fondant, and/or drizzle). The decision engine 226 sends the pastry toppings to the display engine 308. The display engine 308 receives the pastry toppings available and displays them for user selection, an example of which can be seen in FIG. 14. As shown in the pastry topping interface 1400, the user is presented with eleven pastry toppings and a no-topping option. The user system 102 enables user selection of a desired pastry topping. Communication engine 304 sends the topping selection to the decision engine 226. The decision engine 226 receives the topping selection and determines the next customizable element, which in this case is the end of the customizable elements.

If the user selects a photo option in step 613, then the method 600 proceeds to step 634. In step 634, the decision engine 226 determines that the next customizable element is pastry shape, and sends the pastry shapes available for the selected retailer (e.g., those pastry shapes available based on the resources available and the type of pastry selected). It will be appreciated that, in some embodiments, the decision engine 226 may not present the same shape options for pastries with photos and pastries with no graphics. For example, a donut shape pastry may not be desirable for a customized pastry with a photo on it. Decision engine 226 sends the pastry shapes to display engine 308, which presents an interface requesting user selection of a pastry shape, an example of which can be seen in FIG. 9. As shown in pastry shape interface 900, the user is presented with two pastry shapes. The user system 102 enables user selection of a desired pastry shape. Communication engine 304 sends the shape selection to decision engine 226. Decision engine 226 receives the shape selection and determines the next customizable element.

In step 636, decision engine 226 determines that the next customizable element is pastry base, and sends the pastry bases available for the selected retailer. The pastry bases available may depend on the pastry resources available, the pastry type selected and the prior customizable elements selected (in this case shape). The decision engine 226 sends the pastry bases to the display engine 308. The display engine 308 receives the pastry bases available and displays them for user selection, an example of which can be seen in FIG. 10. As shown in the pastry base interface 1000, the user is presented with two pastry bases. The user system 102 enables user selection of a desired pastry base. Communication engine 304 sends the base selection to the decision engine 226. The decision engine 226 receives the base selection and determines the next customizable element.

In step 638, decision engine 226 determines that the next customizable element is pastry filling, and sends the pastry fillings available for the selected retailer. The pastry fillings available may depend on the pastry resources available, the pastry type selected and the prior customizable elements selected (in this case shape and/or base). The decision engine 226 sends the pastry fillings to the display engine 308. The display engine 308 receives the pastry fillings available and displays them for user selection, an example of which can be seen in FIG. 11. As shown in the pastry filling interface 1100, the user is presented with five pastry fillings and a no-filling option. The user system 102 enables user selection of a desired pastry filling. Communication engine 304 sends the filling selection to the decision engine 226. The decision engine 226 receives the filling selection and determines the next customizable element.

In step 640, decision engine 226 determines that the next customizable element is pastry fondant, and sends the pastry fondants available for the selected retailer. The pastry fondants available may depend on the pastry resources available, the pastry type selected and the prior customizable elements selected (in this case shape, base and/or filling). The decision engine 226 sends the pastry fondants to the display engine 308. The display engine 308 receives the pastry fondants available and displays them for user selection, an example of which can be seen in FIG. 11. As shown in the pastry fondants interface 1200, the user is presented with four pastry fondants and a no-fondant option. The user system 102 enables user selection of a desired pastry fondant. Communication engine 304 sends the fondant selection to the decision engine 226. The decision engine 226 receives the fondant selection and determines the next customizable element.

In step 642, the decision engine 226 may instruct the user system 102 to provide a photo. Decision engine 226 would send a photo interface 1500 to display engine 308, an example of which can be seen in FIG. 15. As shown in the photo interface 1500, the user is presented with two choices, to upload a photo or to take a photo. Communication engine 304 sends the photo to the decision engine 226. In response, the decision engine 226 may send a photo adjustment interface 1600 to display engine 308, an example of which can be seen in FIG. 16. In photo adjustment interface 1600, the user is present with the opportunity to adjust the photo. The user may interact with photo adjustment interface 1600 to move and/or scale the photo. Communication engine 304 sends the user's updated photo with photo adjustment interface 1600 to the decision engine 226. The decision engine 226 receives the photo and photo adjustment data and determines the next customizable element, which in this case is the end of the customizable elements. It will be appreciated that the server system 106 may store the photo in the user profile database 216 for user in the future only by the particular user, unless the user makes the photo available for public use or for invitee use.

If the user selects an image option in step 613, then the method 600 proceeds to step 644. In step 644, the decision engine 226 determines that the next customizable element is pastry shape, and sends the pastry shapes available for the selected retailer (e.g., those pastry shapes available based on the resources available and the type of pastry selected). It will be appreciated that, in some embodiments, the decision engine 226 may not present the same shape options for pastries with images, and pastries with no graphics or pastries with photos. For example, a donut shape pastry may not be desirable for a customized pastry with a photo on it. Decision engine 226 sends the pastry shapes to display engine 308, which presents an interface requesting user selection of a pastry shape, an example of which can be seen in FIG. 9. As shown in pastry shape interface 900, the user is presented with two pastry shapes. The user system 102 enables user selection of a desired pastry shape. Communication engine 304 sends the shape selection to decision engine 226. Decision engine 226 receives the shape selection and determines the next customizable element.

In step 646, decision engine 226 determines that the next customizable element is pastry base, and sends the pastry bases available for the selected retailer. The pastry bases available may depend on the pastry resources available, the pastry type selected and the prior customizable elements selected (in this case shape). The decision engine 226 sends the pastry bases to the display engine 308. The display engine 308 receives the pastry bases available and displays them for user selection, an example of which can be seen in FIG. 10. As shown in the pastry base interface 1000, the user is presented with two pastry bases. The user system 102 enables user selection of a desired pastry base. Communication engine 304 sends the base selection to the decision engine 226. The decision engine 226 receives the base selection and determines the next customizable element.

In step 648, decision engine 226 determines that the next customizable element is pastry filling, and sends the pastry fillings available for the selected retailer. The pastry fillings available may depend on the pastry resources available, the pastry type selected and the prior customizable elements selected (in this case shape and/or base). The decision engine 226 sends the pastry fillings to the display engine 308. The display engine 308 receives the pastry fillings available and displays them for user selection, an example of which can be seen in FIG. 11. As shown in the pastry filling interface 1100, the user is presented with five pastry fillings and a no-filling option. The user system 102 enables user selection of a desired pastry filling. Communication engine 304 sends the filling selection to the decision engine 226. The decision engine 226 receives the filling selection and determines the next customizable element.

In step 650, decision engine 226 determines that the next customizable element is pastry fondant, and sends the pastry fondants available for the selected retailer. The pastry fondants available may depend on the pastry resources available, the pastry type selected and the prior customizable elements selected (in this case shape, base and/or filling). The decision engine 226 sends the pastry fondants to the display engine 308. The display engine 308 receives the pastry fondants available and displays them for user selection, an example of which can be seen in FIG. 11. As shown in the pastry fondants interface 1200, the user is presented with four pastry fondants and a no-fondant option. The user system 102 enables user selection of a desired pastry fondant. Communication engine 304 sends the fondant selection to the decision engine 226. The decision engine 226 receives the fondant selection and determines the next customizable element.

In step 652, decision engine 226 determines next to request selection of a stock image. Decision engine 226 sends stock images (e.g., compressed versions or thumbnails) available. The stock images available may depend on the pastry resources available, the pastry type selected and the prior customizable elements selected (in this case shape, base, filling and/or fondant). The decision engine 226 sends the pastry stock images options to the display engine 308. The display engine 308 receives the stock image options available and displays them for user selection, an example of which can be seen in FIG. 17. As shown in the stock image interface 1700, the user is presented with five stock images. The user system 102 enables user selection of a desired stock image. Communication engine 304 sends the stock image to the decision engine 226. The decision engine 226 receives the stock image selection and determines the next customizable element, which in this case is the end of the customizable elements.

Figure 6B:
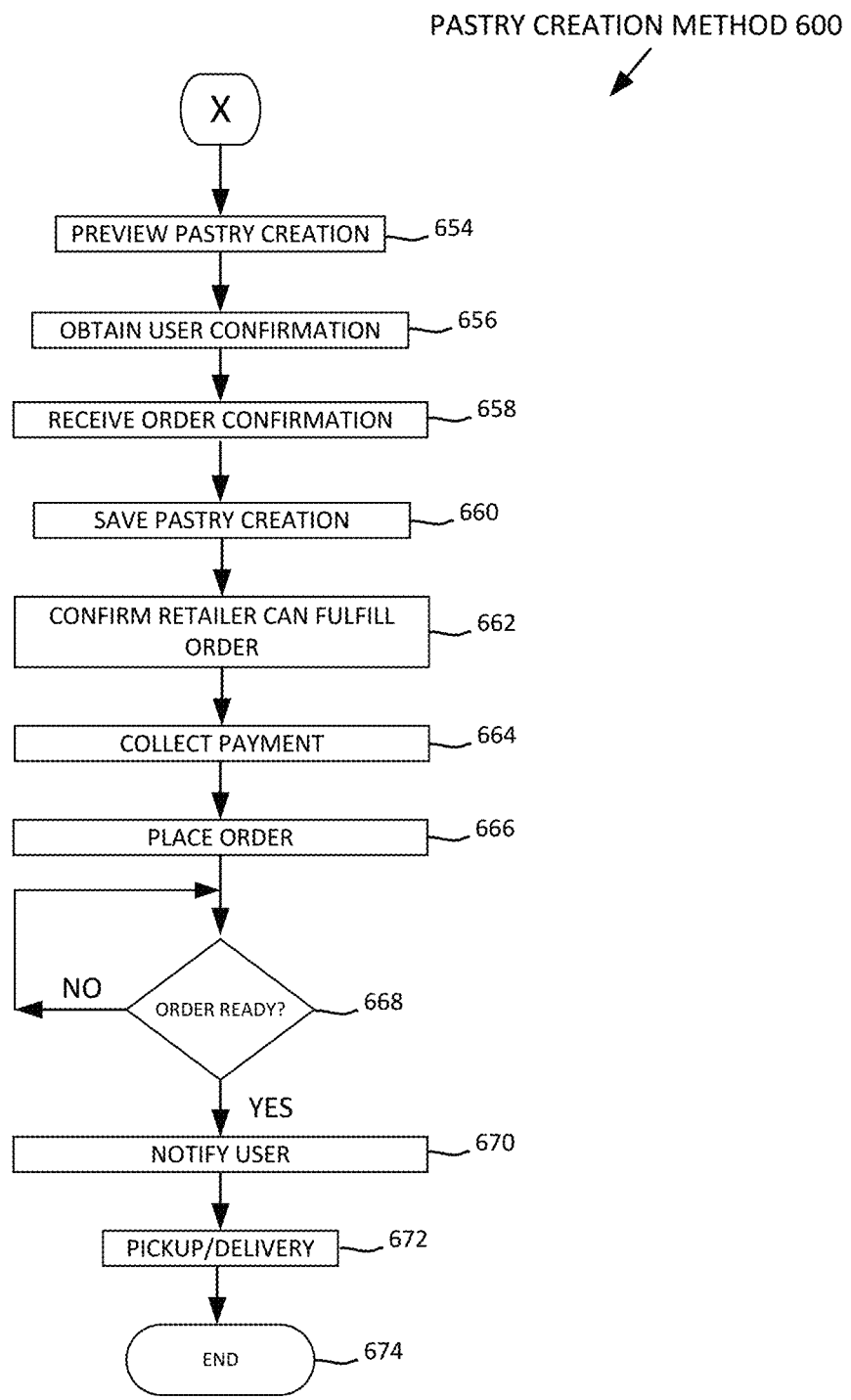
FIG. 6B depicts the flowchart of the pastry creation method from FIG. 6A according to some embodiments.

FIG. 6B is a flowchart depicting additional details of the pastry creation method 600 of FIG. 6A according to some embodiments. Depending on the pastry type and customized elements selected, a pastry design has been created. In step 654, the decision engine 226 generates a preview of the pastry as customized. In some embodiments, a preview of the customized pastry may be presented as each customized element is being selected. The preview can be generated on the server system 106 and send to the user system 102, or generated directly on the user system 102.

In step 656, the user system 102 requests user confirmation of the design and additional order details such as quantity and deadline.

In step 658, the decision engine 226 receives the confirmation and informs the order engine 232.

In step 660, the server system 106 may save the pastry creation, possibly in the user profile database 216.

In step 662, the server system 106 may send the design and additional order details to the resource engine 406 of the selected retailer system 108 to confirm capability of the retailer to fulfill the pastry order, and then may await confirmation.

In step 664, after receiving confirmation from the retailer, the payment engine 408 may send a request to payment engine 228 for payment of the pastry order. Payment engine 228 may respond to the request from payment engine 408 by sending payment information associated with the user to payment engine 408.

In step 666, after retailer system 108 receives the payment for the pastry order, the order engine 226 may send the pastry order to order engine 410. Order engine 410 may receive the pastry order.

In step 668, the order engine 232 may awaits confirmation of completion of the pastry order.

In step 670, after the order is completed, communication engine 212 may send a notification to user of user system 102 of the completion of the order. Notification may be by telephone call, email, text message and other form of communication.

In step 672, the user can pick up the pastries or a courier can deliver the pastries to the user or to a chosen location.

In step 674, the pastry creation method 600 ends.

FIG. 18 depicts a block diagram of an example computing device 1802 according to some embodiments. Any user system 102, server system 106 and retailer system 108 may comprise an instance of computing device 1802. Computing device 1802 comprises a processor 1804, memory 1806, storage 1108, an input device 1810, a communication network interface 1812, and an output device 1814.

Processor 1804 may be configured to execute executable instructions (e.g., programs). In some embodiments, the processor 1804 comprises circuitry or any processor capable of processing the executable instructions.

Memory 1806 stores data. Some examples of memory 1806 include storage devices, such as RAM, ROMA, RAM cache, virtual memory, etc. In various embodiments, working data is stored within memory 1806. The data within memory 1806 may be cleared or ultimately transferred to storage 1808.

Storage 1808 includes any storage configured to retrieve and store data. Some examples of storage 1808 includes flash drives, hard drives, optical drives, and/or magnetic tape. Each of memory system 1806 and storage system 1808 comprises a computer-readable medium, which stores instructions or programs executable by processor 1804.

Input device 1810 is any device that inputs data (e.g., mouse, keyboard, stylus).

Output device 1814 outputs data (e.g., speaker, display, virtual reality headset). It will be appreciated that storage 1808, input device 1810 and output device 1814 may be optional. For example, routers/switchers may comprise processor 1804 and memory 1806 as well as a device to receive and output data (e.g., communication network interface 1812 and/or output device 1814).

Communication network interface 1812 may be coupled to a network (e.g. communication network 104) via communication network interface 1812. Communication network interface 1812 may support communication over an Ethernet connection, a serial connection, a parallel connection, and/or an ATA connection. Communication network interface 1812 may also support wireless communication (e.g., 1102.11 a/b/g/n, WiMax, LTE, WiFi). It will be apparent that communication network interface 1812 may support many wired and wireless standards.

An engine may be hardware or software. In some embodiments, the engine may configure one or more processors to perform functions associated with the engine. Although different engines are discussed herein, it will be appreciated that the server system 106 may include any number of engine performing any or all functionality discussed herein.

The invention claimed is:

1. A system, comprising:
    at least one hardware processor; and
    memory storing program code, the program code executable by the at least one hardware processor to perform the following:
        receive a request to launch a pastry creator interface;
        receive a search request for a retailer to fulfill a customized pastry order for at least one customized pastry, wherein the search request includes search criteria;
        identify the retailer to fulfill the customized pastry order based on the search criteria;
        identify retailer resource information, the retailer resource information identifying a plurality of customizable elements available from the retailer, resource conditions currently available from the retailer and capacity information available from the retailer;
        identify pastry types from the plurality of customizable elements, the pastry types including a with-graphic type or a without-graphic type;
        present the pastry types on the pastry creator interface;
        receive user selection of the with-graphic type of pastry types;
        present for user selection, on the pastry creator interface, one or more options of each of one or more customizable elements of the plurality of customizable elements available from the retailer, the one or more customizable elements being based on the retailer resource information and on the user selection of the with-graphic type of pastry types;
        receive user selections, each user selection of the user selections identifying at least one particular option for each of the one or more customizable elements available from the retailer, wherein the presented one or more options of the one or more customizable elements are further based on each of the user selections;
        generate and display, on the pastry creator interface, a preview of the at least one customized pastry with the one or more customizable elements as each of the one or more customizable elements are selected;
        obtain an image for presentation on the at least one customized pastry;
        generate and display, on the pastry creator interface, the preview of the at least one customized pastry with the selected customizable elements and the obtained image; and
        initiate the customized pastry order based on the user selections and on the image.

2. The system of claim 1, wherein the at least one customized pastry comprises at least one donut.

3. The system of claim 1, wherein the retailer is identified by geographic location.

4. The system of claim 1, wherein the retailer is identified by brand.

5. The system of claim 1, wherein the retailer is identified based on the customizable elements available.

6. The system of claim 1, wherein the retailer is identified based on the capacity available.

7. The system of claim 1, wherein the retailer includes multiple facilities.

8. The system of claim 1, wherein the pastry types include with photo, with predefined image, and with no graphic.

9. The system of claim 1, wherein the customizable elements include two or more selected from a group of pastry base, pastry filling, pastry fondant, pastry drizzle, and pastry topping.

10. The system of claim 1, wherein at least part of the system is on a server system.

11. A method comprising:
    receiving, by at least one processor, a request to launch a pastry creator interface;
    receiving, by the at least one processor, a search request for a retailer to fulfill a customized pastry order for at least one customized pastry, wherein the search request includes search criteria;
    identifying, by the at least one processor, the retailer to fulfill the customized pastry order based on the search criteria;
    identifying, by the at least one processor, retailer resource information, the retailer resource information identifying a plurality of customizable elements available from the retailer, resource conditions currently available from the retailer and capacity information available from the retailer;
    identifying, by the at least one processor, pastry types from the plurality of customizable elements, the pastry types including a with-graphic type or a without-graphic type;
    presenting, by the at least one processor, the pastry types on the pastry creator interface;
    receiving, by the at least one processor, user selection of the with-graphic type of pastry types;
    presenting for user selection, by the at least one processor on the pastry creator interface, one or more options of each of one or more customizable elements of the plurality of customizable elements available from the retailer, the one or more customizable elements being based on the retailer resource information and on the user selection of the with-graphic type of pastry types;
    receiving, by the at least one processor, user selections, each user selection of the user selections identifying at least one particular option for each of the one or more customizable elements available from the retailer, wherein the presented one or more options of the one or more customizable elements are further based on each of the user selections;
    generating and displaying, by at the least one processor on the pastry creator interface, a preview of the at least one customized pastry with the one or more customizable elements as each of the one or more customizable elements are selected;

obtaining, by the at least one processor, an image for presentation on the at least one customized pastry;

generating and displaying, by the at least one processor on the pastry creator interface, the preview of the at least one customized pastry with the selected customizable elements and the obtained image; and initiating, by the at least one processor, the customized pastry order based on the user selections and on the image.

12. The method of claim 11, wherein the at least one customized pastry comprises at least one donut.

13. The method of claim 11, wherein the retailer is identified by geographic location.

14. The method of claim 11, wherein the retailer is identified by brand.

15. The method of claim 11, wherein the retailer is identified based on the customizable elements available.

16. The method of claim 11, wherein the retailer is identified based on the capacity available.

17. The method of claim 11, wherein the retailer includes multiple facilities.

18. The method of claim 11, wherein the pastry types include with photo, with predefined image, and with no graphic.

19. The method of claim 11, wherein the customizable elements include two or more selected from a group of pastry base, pastry filling, pastry fondant, pastry drizzle, and pastry topping.

20. A non-transitory computer readable medium comprising executable instructions that are executable by a processor to perform a method, the method comprising:

receiving a request to launch a pastry creator interface;

receiving a search request for a retailer to fulfill a customized pastry order for at least one customized pastry, wherein the search request includes search criteria;

identifying the retailer to fulfill the customized pastry order based on the search criteria;

identifying retailer resource information, the retailer resource information identifying a plurality of customizable elements available from the retailer, resource conditions currently available from the retailer and capacity information available from the retailer;

identifying pastry types from the plurality of customizable elements, the pastry types including a with-graphic type or a without-graphic type;

presenting the pastry types on the pastry creator interface;

receiving user selection of the with-graphic type of pastry types;

presenting for user selection, on the pastry creator interface, one or more options of each of one or more customizable elements of the plurality of customizable elements available from the retailer, the one or more customizable elements being based on the retailer resource information and on the user selection of the with-graphic type of pastry types;

receiving user selections, each user selection of the user selections identifying at least one particular option for each of the one or more customizable elements available from the retailer, wherein the presented one or more options of the one or more customizable elements are further based on each of the user selections;

generating and displaying, on the pastry creator interface, a preview of the at least one customized pastry with the one or more customizable elements as each of the one or more customizable elements are selected;

obtaining an image for presentation on the at least one customized pastry;

generating and displaying, on the pastry creator interface, the preview of the at least one customized pastry with the selected customizable elements and the obtained image; and initiating the customized pastry order based on the user selections and on the image.

* * * * *